US012754733B2

(12) United States Patent
Gabel et al.

(10) Patent No.: US 12,754,733 B2
(45) Date of Patent: Oct. 6, 2026

(54) SYSTEM AND METHOD THAT ASSISTS WITH AUTOMATING SOFTWARE ENGINEERING TASKS

(71) Applicant: Laredo Labs, Inc., San Jose, CA (US)

(72) Inventors: Mark Gabel, San Jose, CA (US); Daniel Lord, San Jose, CA (US)

(73) Assignee: Laredo Labs, Inc., San Jose, CA (US)

( * ) Notice: Subject to any disclaimer, the term of this patent is extended or adjusted under 35 U.S.C. 154(b) by 326 days.

(21) Appl. No.: 18/524,403

(22) Filed: Nov. 30, 2023

(65) Prior Publication Data

US 2024/0184537 A1 Jun. 6, 2024

Related U.S. Application Data

(60) Provisional application No. 63/429,655, filed on Dec. 2, 2022.

(51) Int. Cl.
*G06F 8/70* (2018.01)
*G06F 8/10* (2018.01)
(Continued)

(52) U.S. Cl.
CPC .................. *G06F 8/70* (2013.01); *G06F 8/10* (2013.01); *G06F 8/30* (2013.01); *G06F 8/33* (2013.01);
(Continued)

(58) Field of Classification Search
CPC ..... G06F 8/10; G06F 8/30; G06F 8/33; G06F 8/35; G06F 8/70; G06F 8/71; G06Q 10/06311
See application file for complete search history.

(56) References Cited

U.S. PATENT DOCUMENTS 9,430,194 B1 8/2016 Childs et al.
9,430,359 B1 8/2016 Troutman et al.
(Continued)

FOREIGN PATENT DOCUMENTS

CN 108563555 A 9/2018
CN 111913872 A 11/2020

OTHER PUBLICATIONS

International Search Report and Written Opinion from corresponding International Patent Application No. PCT/US23/81802, dated Apr. 18, 2024.

(Continued)

*Primary Examiner* — Hanh Thi-Minh Bui
(74) *Attorney, Agent, or Firm* — Dergosits & Noah LLP

(57) ABSTRACT

A system receives a request from a software developer's issue tracker to review an issue report which describes a software engineering task, and outputs the issue report to the issue tracker. The system receives the issue tracker's request for predicted source code changes for the software engineering task, retrieves context data which establishes the software engineering task's context, and transforms the context data to be compatible with the data format used to train a machine-learning model to assist with performing software engineering tasks. The machine-learning model uses the transformed context data to predict source code changes for the software engineering task. The system output the predicted source code changes for the software engineering task to the issue tracker. The system commits source code changes based on the predicted source code changes, as accepted by the issue tracker, to source code associated with the software engineering task.

17 Claims, 15 Drawing Sheets

(51) Int. Cl.

| | |
|---|---|
| ***G06F 8/30*** | (2018.01) |
| ***G06F 8/33*** | (2018.01) |
| ***G06F 8/35*** | (2018.01) |
| ***G06Q 10/0631*** | (2023.01) |

(52) U.S. Cl.
CPC ......... *G06F 8/35* (2013.01); *G06Q 10/06311* (2013.01)

(56) References Cited

U.S. PATENT DOCUMENTS

| | | | |
|---|---|---|---|
| 10,423,522 | B2 | 9/2019 | Bergen |
| 10,459,695 | B2 | 10/2019 | Hauser |
| 10,489,728 | B1 | 11/2019 | Siconolfi et al. |
| 10,713,594 | B2 | 7/2020 | Szeto et al. |
| 11,392,370 | B2 | 7/2022 | Lozoya et al. |
| 11,748,072 | B2 | 9/2023 | Cappello et al. |
| 2015/0100943 | A1 | 4/2015 | Gabel et al. |
| 2018/0300227 | A1 | 10/2018 | Bergen |
| 2019/0108001 | A1* | 4/2019 | Hauser ................ G06F 11/3672 |
| 2020/0204431 | A1* | 6/2020 | Bahrami ................ G06N 20/20 |
| 2021/0342251 | A1 | 11/2021 | Gnaneswaran et al. |
| 2021/0357762 | A1* | 11/2021 | Clement .............. G06N 3/0495 |
| 2022/0147345 | A1 | 5/2022 | Lake et al. |
| 2022/0198223 | A1 | 6/2022 | Godinez et al. |
| 2022/0405397 | A1 | 12/2022 | Golan et al. |
| 2023/0214190 | A1 | 7/2023 | Manivasagam et al. |
| 2023/0359441 | A1 | 11/2023 | Duan et al. |
| 2024/0193072 | A1 | 6/2024 | Kanta et al. |

OTHER PUBLICATIONS

International Preliminary Report on Patentability from corresponding International Patent Application No. PCT/US2023/081802 dated May 27, 2025.

* cited by examiner

SYSTEM AND METHOD THAT ASSISTS WITH AUTOMATING SOFTWARE ENGINEERING TASKS

CLAIM OF PRIORITY

This application claims the benefit of U.S. Provisional Patent Application 63/429,655 entitled, SYSTEM AND AGENT FOR PERFORMING AND ASSISTING WITH GENERALIZED SOFTWARE ENGINEERING TASKS by Gabel, et al., filed Dec. 2, 2022, the entire contents of which is incorporated herein by reference.

BACKGROUND

Software engineering is the process of constructing functional software from requirements and/or specifications, which are human-centered, commonly taking the form of natural language documents and supporting data. The constructed software is machine-centered, taking the form of textual source code and supporting data. Software developers often use software tools to aid with these complex tasks of creating requirements and specifications documents, and constructing source code.

Requirements and specifications documents need to be interpreted and refined in a process that involves understanding ideas at various levels of abstractions, both vague and precise, and organizing these ideas into coherent software designs. Software engineers need to understand technical natural language documents and reconcile their implied needs with the capabilities of the source code's underlying computing platforms.

Software tools for requirements and specifications management and design/architecture are a broad category of products, which include process-focused management systems that facilitate communication and cataloging of requirements and specifications, modeling tools that allow visualization of potential software designs with various degrees of fidelity, and project management systems that are often used to store requirements and specifications, and track their progress toward implementation. These early-stage software tools are alike in that they facilitate relatively narrow tasks and do not even attempt to fully automate these tasks.

Software tools for software construction form an even larger category of products. The majority of these tools are implemented in code editors, which provide assistance for many of the following tasks. Code editors make source code easier to read by organizing and highlighting the source code, and facilitate source code navigation through hyperlinks. Source code can include readme files and other types of text files, such as boilerplate license headers, which are typically associated with source code files. These software construction tools edit code to make its syntactic style consistent, and add dependent source code constructs such as import statements. Code editors generate boilerplate source code from fixed templates, and reducing typing by completing partially-typed words or lines of source code. Software construction tools streamline the process of writing source code, but do not automate the writing of source code, nor assist a software developer to write source code that is more suitably connected to requirements or specifications.

DETAILED DESCRIPTION

Figure 1A:
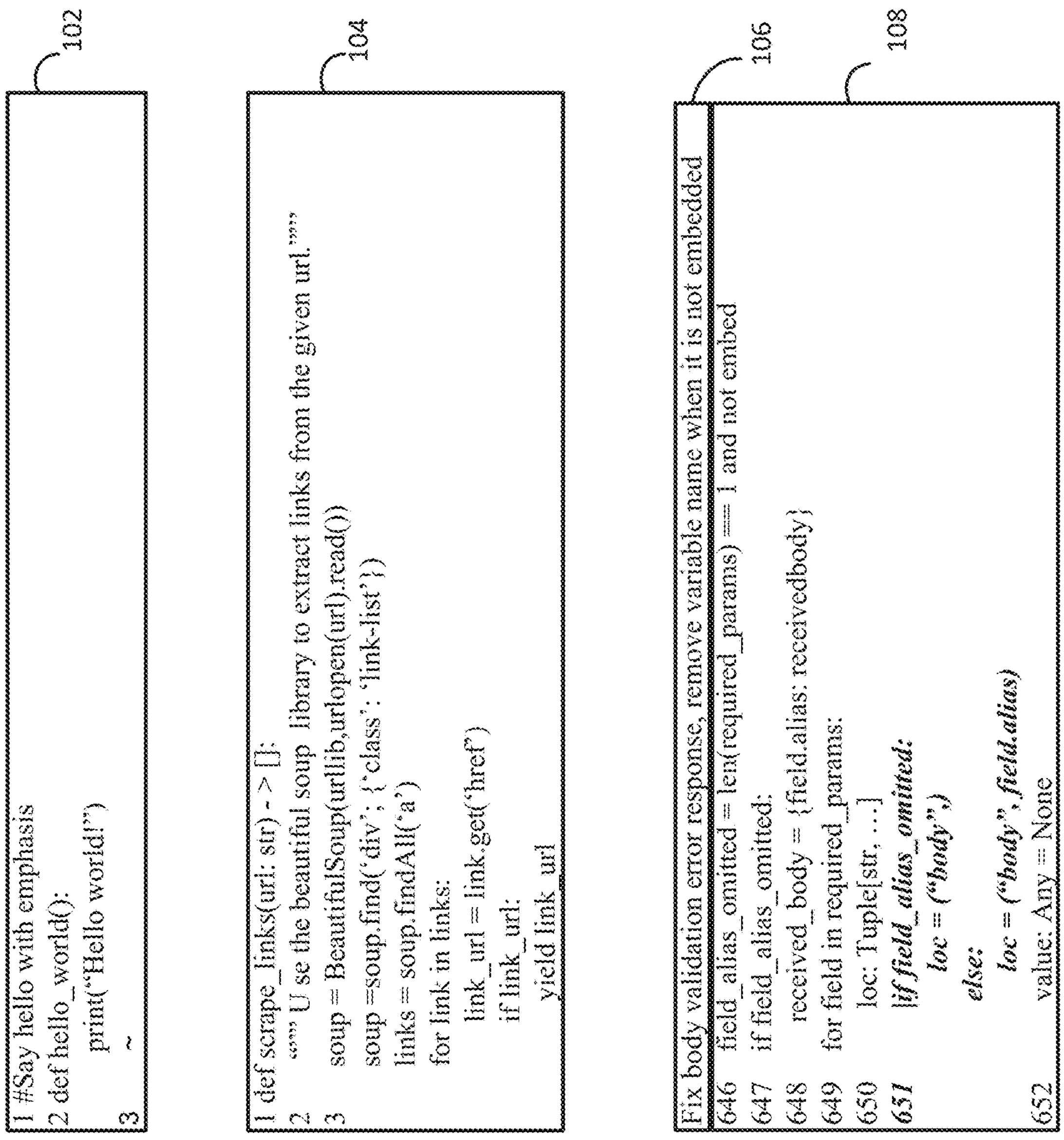
FIG. 1A and FIG. 1B illustrate examples of lines of source code that may be used to assist with performing software engineering tasks, under an embodiment.
Figure 1B:
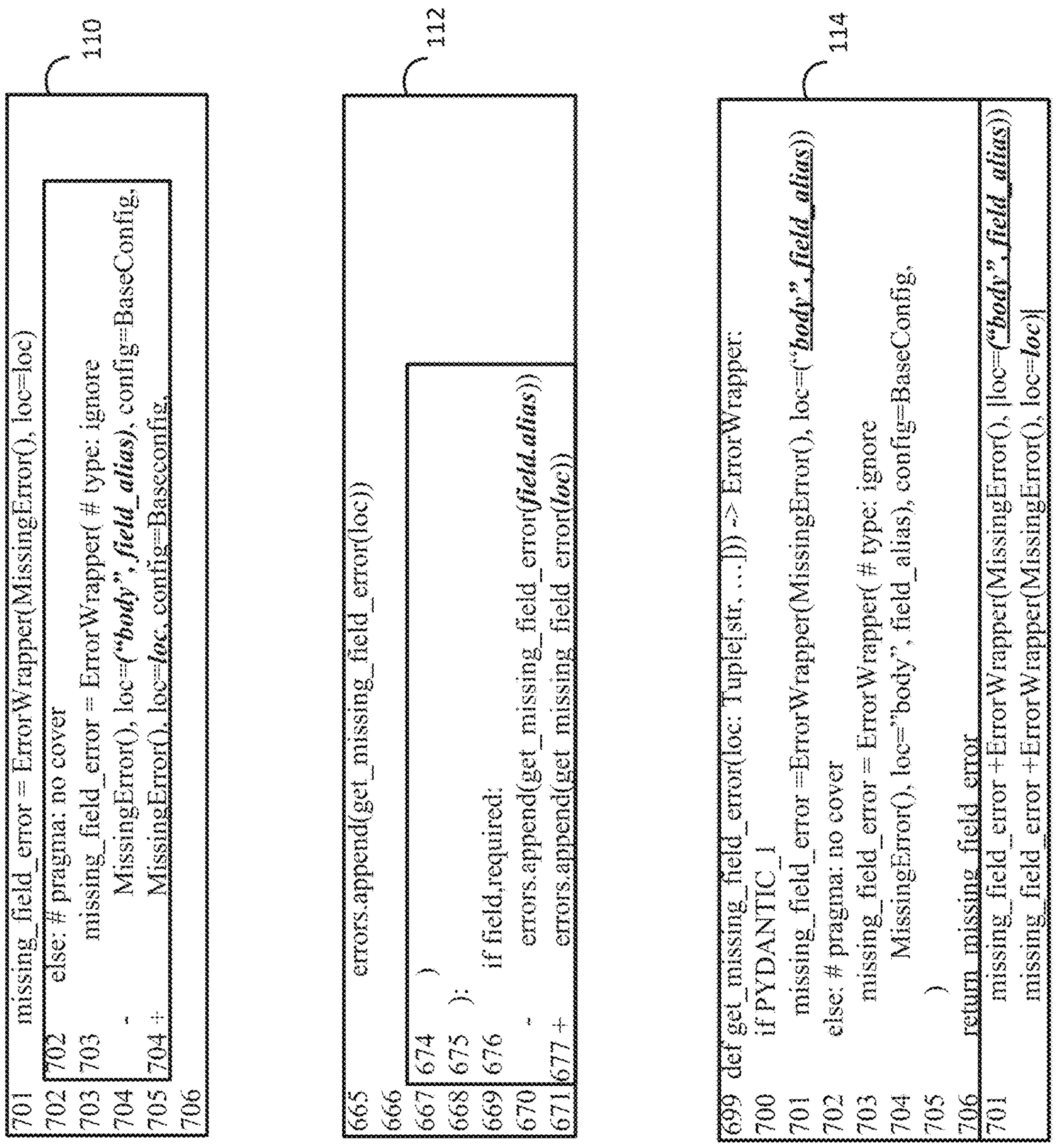

FIG. 1A and FIG. 1B illustrate example lines of source code that may be used to assist with performing software engineering tasks, under an embodiment. Lines of source code 102 illustrate example source code for performing a standard Artificial Intelligence (AI)-driven code completion that interprets a comment to generate a full line of source code, as depicted by FIG. 1A. Lines of source code 104 illustrate example source code for performing a more elaborate AI-driven code completion that generates an entire function body from a function name and a line of documentation contained in a comment, as depicted by FIG. 1A, which is similar to existing state-of-the-art code completion style of tools.

Embodiments of the present disclosure provide a system that includes a higher concept tool that is not similar to anything else on the market. For example, the system integrates more directly with software issue trackers and enables developers to experiment more with purely natural-language inputs. The system differs significantly from software issue trackers which generate issue reports by being able to specialize its behavior through text descriptions of the requirements and specifications of software engineering tasks. Recognizing that change is the center of modern software development, the system has extended the standard code completion idiom with a machine-learning model that can propose changes in issue reports and source code and a toolchain that can present these changes in a streamlined way.

An issue report 106 describes a software engineering task, which the system can read automatically from the issue tracking software that a software developer is using for editing issue reports, requirements, and specifications, as depicted by FIG. 1A. The text of an issue report has a strong effect on what source code is generated, as this ability is derived entirely from the system's novel use of project history. The source code suggestions or predictions are focused on specific software engineering tasks. Lines of source code 108 illustrate a specific prediction for source code, which is based on the issue report 106 for a software engineering task, and appears in the context of existing source code, as depicted by FIG. 1A.

At times, a machine-learning model is confident of the scope of source code changes—not only what needs to be changed, but where the change ends. Lines of source code 110 illustrate a predicted source code change that is completely isolated to a single line and is presented as a boxed-inline popup, as depicted by FIG. 1B.

When confident, a machine-learning model can suggest source code changes at locations other than the location where a software developer is currently working. Lines of source code 112 illustrate a prediction of a complete source code change 8 lines below the current cursor, as depicted by FIG. 1B. And in some cases, predicted source code changes may be hundreds of lines away—or in another source code file entirely. Being able to localize predictions of source code changes—not just predicting them—is key to achieving the grand challenge of having the artificial intelligence solve an issue on its own.

In addition to predicting new lines of source code, the system can help software developers adapt and fix their existing source code. Lines of source code 114 illustrate a machine-learning model that is highly confident in a prediction of a portion of source code which does not match the corresponding portion of existing source code and therefore renders the corresponding portion of existing source code as bold highlighted and underlined, as depicted by FIG. 1B. A software developer will notice such an obvious signal on the corresponding portion of existing source code, select the highlighted portion of source code to view the comparison between the existing portion of source code and the predicted portion of source code, realize any mistake, and correct any mistake.

Embodiments of this disclosure provide a system and an agent that automates generalized software engineering tasks, broadly encompassing work that involves interpreting issue reports, requirements, and specifications, and implementing the interpreted issue reports, requirements, and specifications as source code. The system learns, taught from various sources of software engineering data. Work that was performed and recorded in the past is standardized, abstracted, and built into one or more machine-learning models. An agent then acts as an interface between a software developer and the one or more machine-learning models, leveraging the knowledge learned from past work to streamline and automate present and future work.

Embodiments herein provide a system that trains a machine-learning model to assist with performing software engineering tasks. The system retrieves data from data sources associated with software engineering tasks. The system links the data by linking each issue report which describes any one of the software engineering tasks with source code associated with the any one of the software engineering tasks. The system transforms the data to be compatible with a data format used to train a machine-learning model to assist with performing software engineering tasks. The system trains the machine-learning model with the transformed data to assist with performing a software engineering task by making a prediction of source code changes associated with the software engineering task.

For example, a system retrieves data through a dynamic data pipeline from large-scale open software engineering data, such that the scale of the knowledge learned can grow to the knowledge of collective software engineering intelligence, capturing the current state-of-the-art of the field of software engineering as a whole. The system links the retrieved data by linking commits of source code by a version control system to the issue reports in the issue trackers that the commits resolve, and linking the issue reports to the more general documents that the issue reports reference. The system transforms the linked data into a common unified format, such as representing a commit as an encoded difference of before and after states in textual format. The system trains a machine-learning model with the transformed data that enables making varied predictions about source code changes for a software engineering task. The more links between historical issue reports and historical source code changes that are used to train the machine-learning model, the more current source code changes that the machine-learning model can predict for current issue reports, and the more accurate the predictions will be.

Embodiments herein provide a system that uses a machine-learning model to assist with performing software engineering tasks. The system receives a request from a software developer's issue tracker or code editor to begin work on a software engineering task, and outputs an issue report which describes the software engineering task and/or source code associated with the software engineering task to the issue tracker and/or the code editor. The system stores an update of the issue report or source code changes associated with the software engineering task, received from the issue tracker and/or the code editor. The system receives a request from the issue tracker or the code editor for a predicted completion of the software engineering task, retrieves context data that establishes the software engineering task's context, and transforms the context data to be compatible with a data format used to train a machine-learning model to assist with performing software engineering tasks. The trained machine-learning model uses the transformed context data to predict any number of completions of the software engineering task. The system enables the software developer to complete the software engineering task by outputting the predicted completions of the software engineering task to the issue tracker and/or the code editor.

For example, a system outputs a requested issue report and/or source code for a software engineering task, to fix a body validation error response, to the code editor or the issue tracker of a software developer named Sofia, and then the system stores Sofia's updates, which include her source code changes. In response to Sofia's request for any predicted completions of the software engineering task to fix the body validation error response, the system retrieves context data which establishes the software engineering task's context, such as Sofia's source code changes. Next, the system transforms the context data which includes Sofia's source code changes to be compatible with the data format used to train a machine-learning model to assist with performing software engineering tasks. The trained machine-learning model uses the transformed context data to predict one set of source code changes which has a prediction confidence level of 95% for the software engineering task and another set of source code changes which has a prediction confidence level of 90% for the software engineering task. The system outputs compact representations of the sets of predicted source code changes to Sofia, who can use her issue tracker to expand any selected compact representations to provide her with predicted source code changes within the context of the existing source code, such as the predicted source code change at line 651 in the lines of source code 108 depicted by FIG. 1A, which Sofia can accept to be committed. When enabling Sofia to complete a software engineering task, the machine-learning model can provide multiple alternative sets of predicted source code changes that have sufficiently high prediction confidence levels to be reasonable alternatives as completions to the software engineering task, from which Sofia can select any of the sets of predicted source code changes to be committed.

Embodiments herein provide a system that assists with writing issue reports that describe software engineering tasks and issue information. A system receives a request, from an issue tracker associated with a stakeholder of a software engineering task, to begin an incomplete issue report, which describes the software engineering task and issue information, and which is intended for a software developer, and assigns the software engineering task to the software developer. The system receives the stakeholder's request to predict a completion of the incomplete issue report, retrieves context data which establishes the software engineering task's context, and transforms the context data to be compatible with the data format used to train a machine-learning model to assist with software engineering tasks. The trained machine-learning model uses the transformed context data to predict the completion of the incomplete issue report which describes the software engineering task and issue information. The system enables the software developer to complete the software engineering task by outputting an accepted completion of the incomplete issue report based on the predicted completion of the incomplete issue report, which describes the software engineering task and the issue information, to the software developer's issue tracker.

For example, a system initiates a requested issue report for a software engineering task, to fix a body validation error response, to the issue tracker of Stacy Holder, who is a stakeholder in the software engineering task, and then the system responds to Stacy's next request by assigning the software engineering task to a software developer named Sofia. In response to Stacy's subsequent request to predict the completion of her incomplete issue report, the system retrieves context data which establishes the software engineering task's context, and transforms the context data, which includes the incomplete issue report, to be compatible with the data format used to train a machine-learning model to assist with performing software engineering tasks. The trained machine-learning model uses the transformed context data to predict the completion of the incomplete issue report for the software engineering task to fix the body validation error response, which corrects the description of the software engineering task to require the removal of a variable name when it is not embedded, instead of the incorrect description of the software engineering task requiring the removal of a variable name when it is not omitted. The system enables Sofia to complete her assigned software engineering task by outputting the corrected description of the incomplete issue report for the software engineering task to fix the body validation error response. In addition to the machine-learning model being trained to predict source code changes for software engineering tasks, the machine-learning model has been trained on a sufficient variety of issue reports to be able to predict the completion of an incomplete issue report, which can require the deleting and/or the replacing of part of the incomplete issue report, such as the deletion/replacement of the word "omitted" which was erroneously included in the software engineering task.

Embodiments herein provide a system that assists with automating software engineering tasks. The system receives a request from a software developer's issue tracker to review an issue report which describes a software engineering task, and outputs the issue report to the issue tracker. The system receives the issue tracker's request for predicted source code changes for the software engineering task, retrieves context data which establishes the software engineering task's context, and transforms the context data to be compatible with the data format used to train a machine-learning model to assist with performing software engineering tasks. The trained machine-learning model uses the transformed context data to predict source code changes for the software engineering task. The system outputs the predicted source code changes for the software engineering task to the issue tracker. The system commits source code changes based on the predicted source code changes, as accepted by the issue tracker, to source code associated with the software engineering task.

For example, a system outputs a requested issue report which describes a software engineering task, to fix a body validation error response, to the issue tracker of a software developer named Sofia. In response to Sofia's request to predict source code changes for the software engineering task to fix the body validation error response, the system retrieves context data which establishes the software engineering task's context, such as Sofia's update to the issue report for the software engineering task. Next, the system transforms the context data which includes Sofia's updated issue report to be compatible with the data format used to train a machine-learning model to assist with performing software engineering tasks. The trained machine-learning model uses the transformed context data to predict source code changes, such as the new source code at line 651 in the lines of source code 108 depicted by FIG. 1A. The system outputs the predicted source code changes for the software engineering task to Sofia, who commits any source code change that she accepts. Even if Sofia worked only on the issue report which describes her software engineering task, without generating any source code changes for the software engineering task, and then requested the predicted source code changes for the software engineering task, the system can use the updated issue report to predict every source code change required for completion of the software engineering task, thereby automating the generation of source code changes.

Embodiments herein provide a system that assists with writing source code for software engineering tasks. A system stores a source code change, at a location in source code associated with a software engineering task, received from a software developer's code editor. The system receives a request from the code editor for predicted source code changes at a source code location, retrieves context data which establishes the software engineering task's context, and transforms the context data to be compatible with a data format used to train a machine-learning model to assist with performing software engineering tasks. The trained machine-learning model uses the transformed context data to predict source code changes at the source code location. The system outputs the predicted source code changes at the source code location to the software developer's code editor. The system commits source code changes based on the predicted source code changes, as accepted by the software developer, at the source code location to source code associated with the software engineering task.

For example, a system stores some of the source code changes required for a software engineering task to fix a body validation error response, which are generated by the code editor of a software developer named Sofia. In response to Sofia's request for predicted source code changes at line 701 in source code where she is working on the software engineering task to fix the body validation error response, the system retrieves context data which establishes the software engineering task's context, such as Sofia's source code changes. Next, the system transforms the context data which includes Sofia's source code changes to be compatible with the data format used to train a machine-learning model to assist with performing software engineering tasks. The trained machine-learning model uses the transformed context data to predict source code changes at line 701 in the source code to complete the localized software engineering task to fix a body validation error response, as illustrated by line 704 in the lines of source code 110 depicted by FIG. 1B. The system outputs the predicted source code changes at line 704 in the source code to Sofia's code editor, which enables her to complete her localized software engineering task, to commit the predicted source code changes that she accepts, and to move on to any other location in source code where she wants to focus on completing her software engineering task to fix the body validation error response.

Embodiments herein provide a system that assists with identifying unpredicted portions of source code files for software engineering tasks. A system receives source code changes from a code editor associated with a software developer, and stores the source code changes in a source code file associated with a software engineering task. The system receives a request from the code editor to predict source code for the source code file, retrieves context data which establishes the software engineering task's context, and transforms the context data to be compatible with a data format used to train a machine-learning model to assist with performing software engineering tasks. The trained machine-learning model uses the transformed context data to predict the source code for the source code file, with portions of the source code file corresponding to portions of the predicted source code. The system identifies each portion of the source code file which is determined to be differing from a corresponding portion of the predicted source code, via the code editor. The system commits any differing portions of the predicted source code, which are requested and accepted by the code editor, to the source code file.

For example, a system stores source code changes in a source code file for a software engineering task to fix a body validation error response, which are generated by the code editor of a software developer named Sofia. In response to Sofia's request to predict source code for the source code file for the software engineering task to fix the body validation error response, the system retrieves context data which establishes the software engineering task's context, such as Sofia's source code changes in the source code file. Next, the system transforms the context data which includes Sofia's source code changes to be compatible with the data format used to train a machine-learning model to assist with performing software engineering tasks. The trained machine-learning model uses the transformed context data to predict source code for the source code file, with each portion of the source code file corresponding to a portion of the predicted source code. Sofia uses her code editor to review the bold highlighted and underlined portion of line 701 ("body", field alias) in the lines of source code 114 depicted by FIG. 1B, select the bold highlighted portion of line 701, which displays the portion of predicted source code (loc) which differs from the bold highlighted portion of line 701, and accept the portion of the predicted source code to replace the bold highlighted portion of line 701. If Sofia's source code changes started to fix the body validation error response, then the many highlighted portions of the source code file could identify the predicted source code required to complete her software engineering task, but if Sofia's source code changes completed her task, then the few highlighted portions of the source code file could identify the predicted source code that corrects her possible mistakes and/or makes her source code more efficient.

Figure 2:
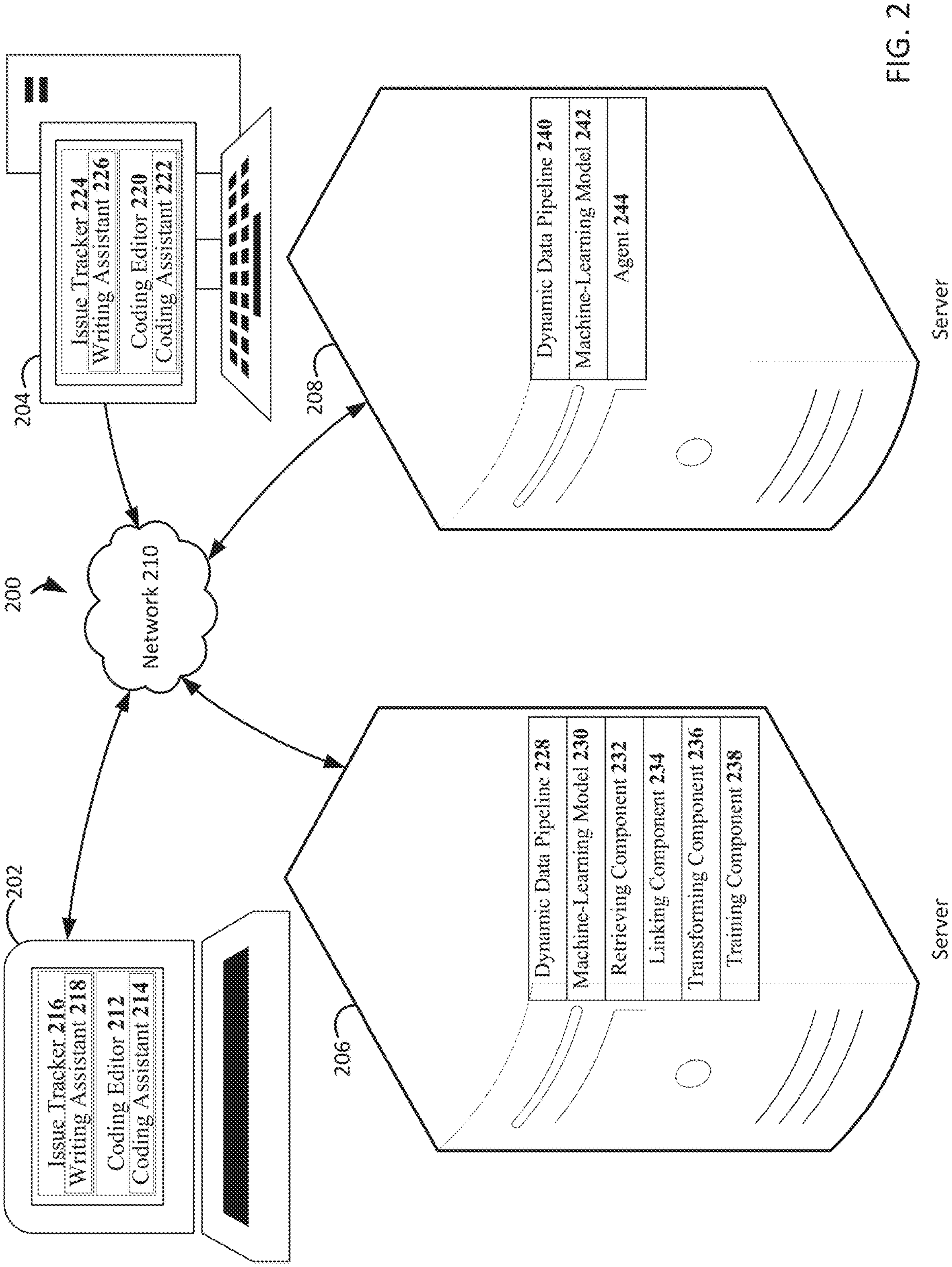
FIG. 2 illustrates a block diagram of an example system that assists with performing software engineering tasks, under an embodiment.

FIG. 2 illustrates a block diagram of a system 200 that assists with performing software engineering tasks, under an embodiment. As shown in FIG. 2, the system 200 may illustrate a cloud computing environment in which data, applications, services, and other resources are stored and delivered through shared data-centers and appear as a single point of access for the end users. The system 200 may also represent any other type of distributed computer network environment in which servers control the storage and distribution of resources and services for different client users.

In an embodiment, the system 200 represents a cloud computing system that includes a first client 202, a second client 204, and a first server 206 and a second server 208 that may be provided by a hosting company. The clients 202-204 and the servers 206-208 communicate via a network 210.

The client 202, which may be referred to as a software developer's client 202, includes a word processor-like software to edit source code, such as a version control system, which may be referred to as a code editor 212, which incorporates a coding assistant 214, which may be implemented as a plugin that extends the native functionality of the code editor 212 by focusing on helping a user write the most appropriate source code that accomplishes a given task. Similarly, the client 202 includes word processor-like software, which may be referred to as an issue tracker 216, to write natural language descriptions of issue reports, and project requirements and specifications, for software engineering tasks, which incorporates a writing assistant 218, which may be implemented as a plugin that extends the native functionality of the issue tracker 216, by focusing on helping a user write the most appropriate natural language text that accomplishes a given task. Similarly, the client 204, which may be referred to as the client 204 for a stakeholder of the software engineering task, can include a code editor 220, which can incorporate a coding assistant 222, and an issue tracker 224, which can incorporate a writing assistant 226.

The server 206, which may be referred to as a training server 206, can include a dynamic data pipeline 228, one or more machine-learning model(s) 230, a retrieving component 232, a linking component 234, a transforming component 236, and a training component 238. The server 208, which may be referred to as a production server 208, can include a dynamic data pipeline 240, one or more machine-learning model(s) 242, and an agent 244. The machine-learning models 230 and 242 may be based on any of a variety of models, such as gradient boosted classifiers, k-nearest neighbor classifiers, neural networks, random forests, support vector machines, naive Bayes classifiers, and logistic regression models. The assistants 214, 218, 222, and 226 may be provided by the training server 206 and/or the production server 208 to assist the code editor 212, the issue tracker 216, the code editor 220, and the issue tracker 224 to interact with the components 228-238 residing on the training server 206, and/or the system components 240-244 residing on the production server 208. The system 200 may include any number of clients 202-204, any number of servers 206-208, any number of networks 210, and any number of the components 212-244 that are depicted in FIG. 2 as residing on any of the clients 202-204 or the servers 206-208.

The clients 202-204 and the servers 206-208 may each be substantially similar to the system 900 depicted in FIG. 9 and described below. FIG. 2 depicts the system components 228-238 residing completely on the first server 206, and the system components 240-244 residing completely on the second server 208, but the system components 228-244 may reside completely on the first server 206, completely on the second server 208, completely on the clients 202-204, completely on another server that is not depicted in FIG. 2, or in any combination of partially on the servers 206-208, partially on the clients 202-204, and partially on the other server.

Software engineers, software developers, and software project stakeholders typically keep digital records of their work in various stores of information, such as issue trackers, project documentation, text communication, and version control systems. Issue trackers, which were originally designed to track defects in software, are today used for filing and tracking the progress of all types of software engineering work. Issue trackers contain numbered natural language issue reports that may be assigned to personnel, such as software developers, as work items. These issue reports have meta-labels, such as priority or subsystem, and they have comments and editing functionality that enables updates as work progresses.

Project documentation consists of documents authored by either the software developers themselves or other software project stakeholders. These documents may contain information about project requirements, specifications, schedules, work progress, and/or descriptions of the built software itself. Text communication occurs between team members, both software developers and other software project stakeholders, and may be synchronous or asynchronous and direct (one-on-one) or in a group. Primary examples include email and chat platforms.

Version control systems are temporal databases that hold the authoritative copy of the source code of a software engineering project. Version control systems are notable in that they store the entire history of all data that they contain. The history is segmented into atomic units commonly referred to as commits, which contain a set of file-level changes coupled with a text description. This history allows software developers to track the provenance of source code changes and retrieve any recorded version of the source code. In addition to software source code, version control systems often contain configuration, supporting data, and even certain forms of documentation.

Figure 3:
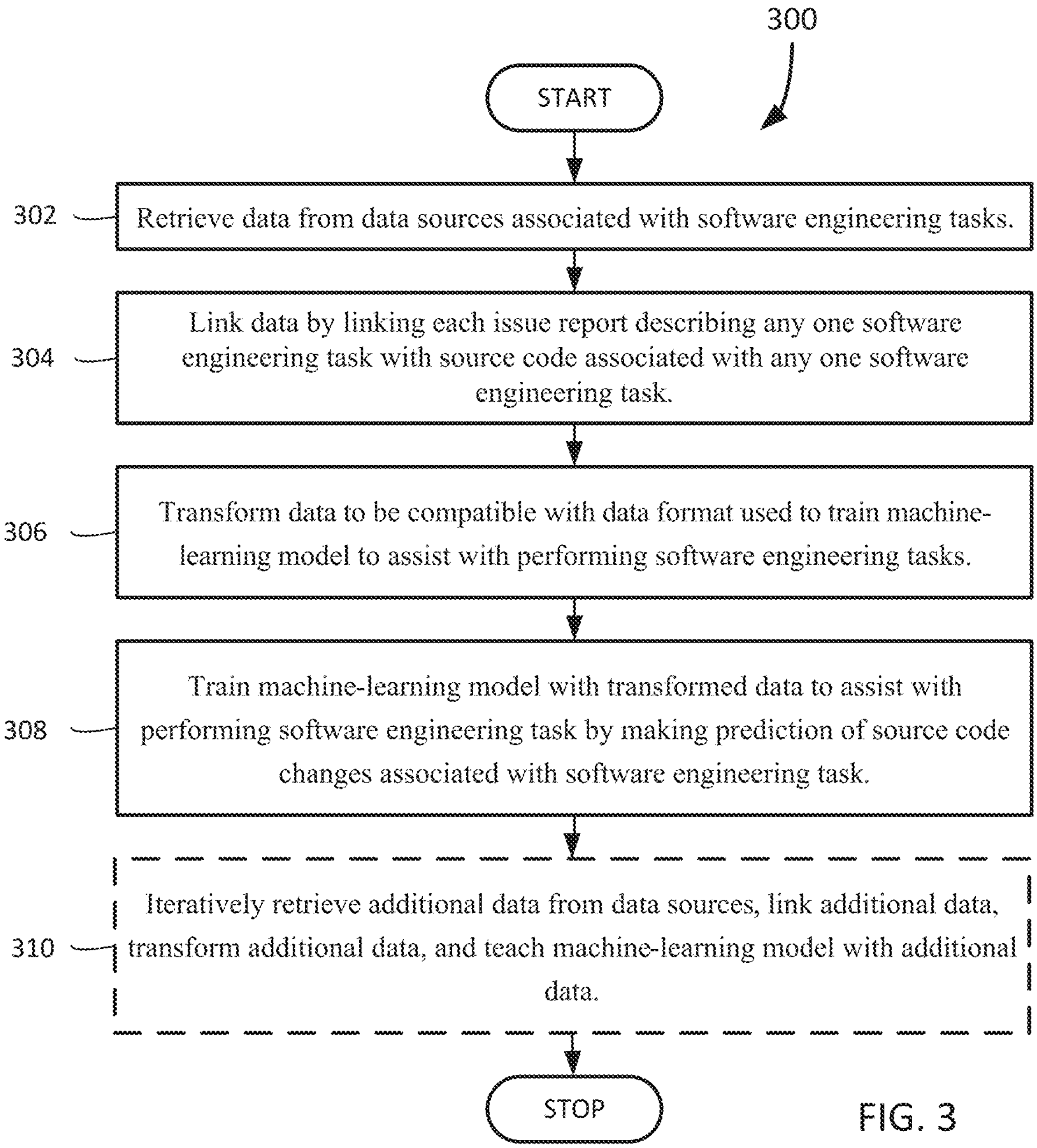
FIG. 3 depict a flowchart that illustrates a method that trains a machine-learning model to assist with performing software engineering tasks, under an embodiment.

The embodiments of the system 200 learn by processing heterogeneous software engineering data from disparate sources into a common stream and using the stream of data to train the machine-learning model(s) 230 to assist with performing software engineering tasks. FIG. 3 is a flowchart that illustrates a method that trains the machine-learning model(s) 230 to assist with performing software engineering tasks, under an embodiment. Flowchart 300 illustrates method acts illustrated as flowchart blocks for certain steps involved in and/or between the clients 202-204 and/or the servers 206-208 of FIG. 2.

The system retrieves data from multiple data sources associated with software engineering tasks, block 302. The system collects various types and amounts of data. For example, and without limitation, this may include the retrieving component 232 retrieving all data through the dynamic data pipeline 228 to a central database.

Data can be information which has been translated into a form that is efficient for movement or processing. A data source can be a location where information originates. A software engineering task can be an amount of work for the design, development, testing, and/or maintenance of computer programs.

Each source of data is connected to a central location. Local data sources are accessed by reading files, while network sources are accessed via network file transfers or more standardized application programming interfaces (APIs). The retrieving component 232 may fully copy data to the central database, or the retrieving component 232 may connect data such that the data becomes accessible on-demand.

The retrieving component 232 may retrieve the data from data sources which include a data source associated with multiple software engineering projects associated with a single enterprise. For example, the training server 206 may scale up data acquisition and the subsequent learning procedure from a single project's information to that data acquisition and training of more than one project. Within an organization, this process can facilitate institutional memory, enabling work and knowledge learned from projects in the past and across the organization to be transferred into new and current projects. A software engineering project can be a carefully planned endeavor to achieve a particular aim for the design, development, testing, and/or maintenance of computer programs. A single enterprise can be a business or a company.

The retrieving component 232 may retrieve the data from data sources which include an open-source software project. For example, the training server 206 can further scale the same data acquisition and learning procedure through the use of large-scale open software engineering data, such as sources of information made public by open-source software projects. As the training server 206 enhances the scale, the knowledge learned grows from that of an institutional memory to the knowledge of one of collective software engineering intelligence, capturing the current state-of-the-art of the field of software engineering as a whole. An open-source software project can be a carefully planned endeavor to achieve a particular aim for the design, development, testing, and/or maintenance of computer programs that have code which is made freely available for possible modification and redistribution.

The training server 206 encodes a project history as text and has the project history learned within a large language model. The training server 206 can scale this process up indefinitely and achieve arbitrary levels of accuracy, subject to computing costs and data availability. The project history models follow the same scaling laws as other large language modeling tasks, such that scaling them up with more data and more computing capabilities will make them more accurate, as the more resources invested results in more accuracy. As the training server 206 diversifies its data from even more distinct projects, the accuracy can rise to breakthrough levels.

After retrieving data, the system links the data by linking each issue report which describes any one of the software engineering tasks with source code associated with the any one of the software engineering tasks, block 304. The system links data to enable predictions of source code data based on issue report data. By way of example, and without limitation, this may include the linking component 234 linking data together to establish locality. An issue report can be a text account that describes a problem. Source code can be a text listing of commands to be compiled or assembled into an executable computer program. In addition, source code can include readme files and other types of text files, such as boilerplate license headers, which are typically associated with source code files.

Many data entries will be more strongly related to each other than to other data entries, such as a document about subsystem A is more relevant to the source code of subsystem A than this document is to any other source code. The linking component 234 can link commits of source code by a version control system, such as the code editor 212, to the issue reports in the issue tracker 216 that the commits resolve, and link the issue reports to the more general documents that the issue reports reference. The training server 206 can expand links such as these and store the expanded links in a central database.

Following the linking of the data, the system transforms the data to be compatible with a data format used to train any machine-learning model(s), block 306. The system unifies the various data formats of the various types of data. In embodiments, this may include the transforming component 236 transforming the data into a common unified format compatible with the learning method in use.

Compatible can be the ability to be used with specified software without special adaptation or modification. A data format can be a structural organization of information. A machine-learning model can be an application of artificial intelligence to dynamic data that provides a system with the ability to automatically learn and improve from experience without being explicitly programmed.

While each data source is primarily text-based, the structure and content of that text varies. Transformations vary with the input data and the learning method, but an example transformation may involve the transforming component 236 taking a source code commit from a version control system, which can generally be viewed as a before and after state, and representing the commit as an encoded difference of the two states in textual format. Another example of a transformation may involve the training server 206 filtering irrelevant and unhelpful-to-process parts of individual data items, such as the boilerplate license header from a source code file. The transforming component 236 can transform the data separately, thereby producing a processed dataset, or the transforming component 236 can transform the data on-demand as part of a pipeline.

Having transformed the data, the system trains the machine-learning model(s) with the transformed data to assist with performing a software engineering task by making a prediction of source code changes for the software engineering task, block 308. The system trains the machine-learning model(s) to predict source code for current issues based on the history of source code created for issues. For example, and without limitation, this may include the training component 238 applying a learning method to train the machine-learning model(s) 230. The training component 238 can feed the complete pipeline to a learning method, which trains the machine-learning model(s) 230 with the data capable of making varied predictions about that data and similar data, such as source code changes for a software engineering task. Examples of learning methods include rule-based engines and machine-learning methods such as deep neural networks.

Transformed data can be information that has been converted from one format to another format. A prediction can be a forecast. A source code change can be a modification to a text listing of commands to be compiled or assembled into an executable computer program.

The training component 238 trains each instance of the machine-learning model(s) 230 on data that open-source developers contributed strictly before a cutoff date, and then performs the evaluations/experiments on all data strictly after that date. Put plainly, the training component 238 evaluates the ability of the machine-learning model(s) 230 to perform "new" work when trained on "old" work.

Software engineering is a continuously-updating discipline. On a broad scale, best practices evolve, new programming languages emerge, and libraries and other components rise and fall in popularity. More urgent updates occur when previously-unknown security vulnerabilities are discovered and must be addressed in current software and prevented in future source code. The training server 206 can adapt the steps of retrieving, linking, and transforming data for the general learning procedure by adding new source data, thereby freshening the database with new entries. Those same steps of retrieving, linking, and transforming data may also service the removal of existing data, thereby forgetting bad or obsolete software engineering knowledge.

Therefore, after initially training the machine-learning model(s) the system iteratively retrieves additional data from the data sources, links the additional data, transforms the additional data, and trains the machine-learning model(s) with transformed additional data, block 310. The system can update the training of the machine-learning model(s). By way of example, and without limitation, this may include the training server 206 using the updated data to apply the learning procedure to create the updated machine-learning model(s) 230. Iteratively training the machine-learning model(s) 230 with the transformed additional data may include initializing the machine-learning model(s) 230 and then using only the transformed additional data to train the initialized machine-learning model(s) 230, using both the transformed additional data and the data that was previously transformed to train the machine-learning model(s) 230, or using the transformed additional data incrementally to train the machine-learning model(s) 230. For example, the training server 206 can use the additional data to train the machine-learning model(s) 230 entirely from scratch, creating an entirely new machine-learning model(s) 230 from the additional data, or use the additional data to train the machine-learning model(s) 230 incrementally.

Transformed additional data can be supplemental information that has been converted from one format to another format. Incrementally can be in regular increases, additions, or stages. An initialized machine-learning model can be an application of artificial intelligence to dynamic data that provides a system with the ability to automatically learn and improve from experience without being explicitly programmed, and which has been put in a starting condition.

The training server 206 adds, removes, and updates data as annotated data in the database, such that the data is identifiable by the learning procedure. If supported, the training of the machine-learning model(s) 230 may then restart its process using the current machine-learning model(s) 230 as input, focusing solely on the updates of the data. Such focus may be facilitated by the training server 206 enabling the learning procedure to access only the updated data, or the training server 206 may continue to access all the data but adjust its weighting of the updated data accordingly.

The standard learning procedure may enable the machine-learning model(s) 230 to learn an individual project or team's knowledge, while the scaled learning procedure may enable the machine-learning model(s) 230 to learn general software engineering knowledge. In many cases, both types of machine-learning models 230 will be beneficial. Therefore, the machine-learning model(s) 230 may include a group of the machine-learning model(s) 230 trained with data associated with multiple software engineering projects associated with a single enterprise and the machine-learning model(s) 230 trained with data associated with general software engineering knowledge, or the machine-learning model(s) 230 trained with both data associated with multiple software engineering projects associated with a single enterprise and data associated with general software engineering knowledge. For example, the downstream agent 244 can make use of these machine-learning models 230 being adapted to use more than one of the machine-learning model(s) 242, such as by using one focused machine-learning model 242 for team-specific tasks and one broad-scale machine-learning model 242 for general knowledge. However, such a procedure may also be facilitated by the learning procedure itself, such as producing exactly one hybrid machine-learning model 242, which is trained with both team-specific tasks and broad-scale general knowledge.

Assuming that the training server 206 has performed the above large-scale adaptation and generated the general machine-learning model(s) 242, then the training server 206 can perform the steps of retrieving, linking, and transforming of data solely on the possibly private and confidential data of one project, team, or individual. Therefore, training the machine-learning model(s) 230 may include learning with data associated with general software engineering knowledge, and then learning with data, which is associated with the single enterprise, which is weighted lower than the data associated with general software engineering knowledge. For example, the training server 206 may adapt by using a general machine-learning model 230 as the point of initialization, and then applying the learning method to the updated data, based on training a specific machine-learning model 230 with the specialized data. To facilitate the blending of the knowledge captured in the machine-learning model(s) 230 without overwriting it, the training server 206 may adapt the learning procedure to lower its weights of the new specialized data. General software engineering knowledge can be an extensive comprehension of the design, development, testing, and/or maintenance of computer programs. The more links between historical issue reports and historical source code changes that are used to train the machine-learning model(s), the more current source code changes that the machine-learning model(s) can predict for current issue reports, and the more accurate the predictions will be.

The system 200 is built around the project history machine-learning model(s) 242 that smoothly integrates assistance with software developers' existing workflows. The system 200 exposes the machine-learning model(s) 242 via tools that are similar to—but functionally subsume—code completion style of tools, such as the code editors 212 and 220. These code completion-style tools have the advantage that enable a software developer to move very smoothly between assisted and unassisted development. There is no jarring moment that interrupts their flow when such a tool does something unanticipated: the software developer simply ignores the assistance and keeps typing.

Although FIG. 3 depicts the blocks 302-310 occurring in a specific order, the blocks 302-310 may occur in another order. In other implementations, each of the blocks 302-310 may also be executed in combination with other blocks and/or some blocks may be divided into a different set of blocks.

To facilitate and automate software engineering tasks, the system 200 connects the machine-learning model(s) 242 to a software developer and the software developer's data through an agent 244. The role of the agent 244 is to collect real-time data about the software engineering task at hand, transmit the real-time data to the machine-learning model(s) 242 to query for ways to complete or assist with the software engineering task, and present that automation or assistance to a human software developer.

The general forms of the agent 244 involve the dynamic data pipeline 240 that mirrors the dynamic data pipeline 228 used to build the machine-learning model(s) 242. The agent 244 uses the dynamic data pipeline 240 to establish the context for the current software engineering task. The agent 244 applies this context with the machine-learning model(s) 242, producing some form of fully- or partially-automated work. That work is then presented by the agent 244 through various specific tool instantiations.

The machine-learning model(s) 242 produced by the learning procedure captures a wide array of software engineering knowledge. The machine-learning model(s) 242 learned about issue reports, requirements, specifications, and design from natural language sources, and learns about software construction via programming languages from structured source code sources. Linked data sources enable the machine-learning model(s) 230 to connect these different types of knowledge.

The steps of retrieving, linking, and transforming data for the general learning procedure describe the connection, centralization, linking, and normalization of software engineering data as it is consumed by the machine-learning model(s) 230 during the learning procedure. Use of such the machine-learning model(s) 242 by the agent 244 requires extracting or querying knowledge from the machine-learning model(s) 242, which in turn requires a similar but localized data extraction procedure. Software engineering work performed or facilitated by the agent 244 is done in the context of a specific project and software engineering task. A subset of the project's linked data will be relevant to that software engineering task and must be retrieved when assisting with that software engineering task. For example, a software engineering task assigned through issue tracking software may include the text of the issue report as dynamic data, the software engineering task discussed in a particular thread of a chat or email system may include the text of that thread, and a task relevant to one particular subsystem of a software project may include the programming language and the source code of that subsystem.

The collection of such data is performed in the dynamic data pipeline 240. The collecting or retrieving mechanism may be similar to that used in an instantiation of the general learning procedure, but it must adapt to additional constraints. The generally single software engineering task at hand carries with it much less data than that consumed during training, and the current data must be updated and collected in real time. For example, if a participating project stakeholder creates a comment that clarifies the original issue report, on future interactions with the machine-learning model(s) 242, the dynamic data pipeline 240 may include this clarification.

If a software developer seeks additional clarification on a software engineering task from a colleague through a chat system, future model queries by the agent 244 may include the text of this interaction. If a software developer performs some part of a software engineering task by writing and saving some amount of source code, further interactions between the agent 244 and the machine-learning model(s) 242 will include this partially-finished work. If a software developer deletes some amount of source code to partially complete a software engineering task, continued interactions will include the fact that this source code was removed.

The dynamic data pipeline 240 is responsible for maintaining constant data connections to each of these sources. Example forms of these connections include application programming interfaces (APIs), database connections, and local or network file system reading operations.

The agent 244 uses the dynamic data pipeline 240 to establish a context for the given software engineering task, which is presented to the machine-learning model(s) 242 as a query. The training server 206 may, and will likely and ideally, have been exposed the machine-learning model(s) 230 to similar or similarly-adaptable contexts. This enables the machine-learning model(s) 242 to use its embedded knowledge to make a prediction for how a software engineering task should be performed.

Figure 4A:
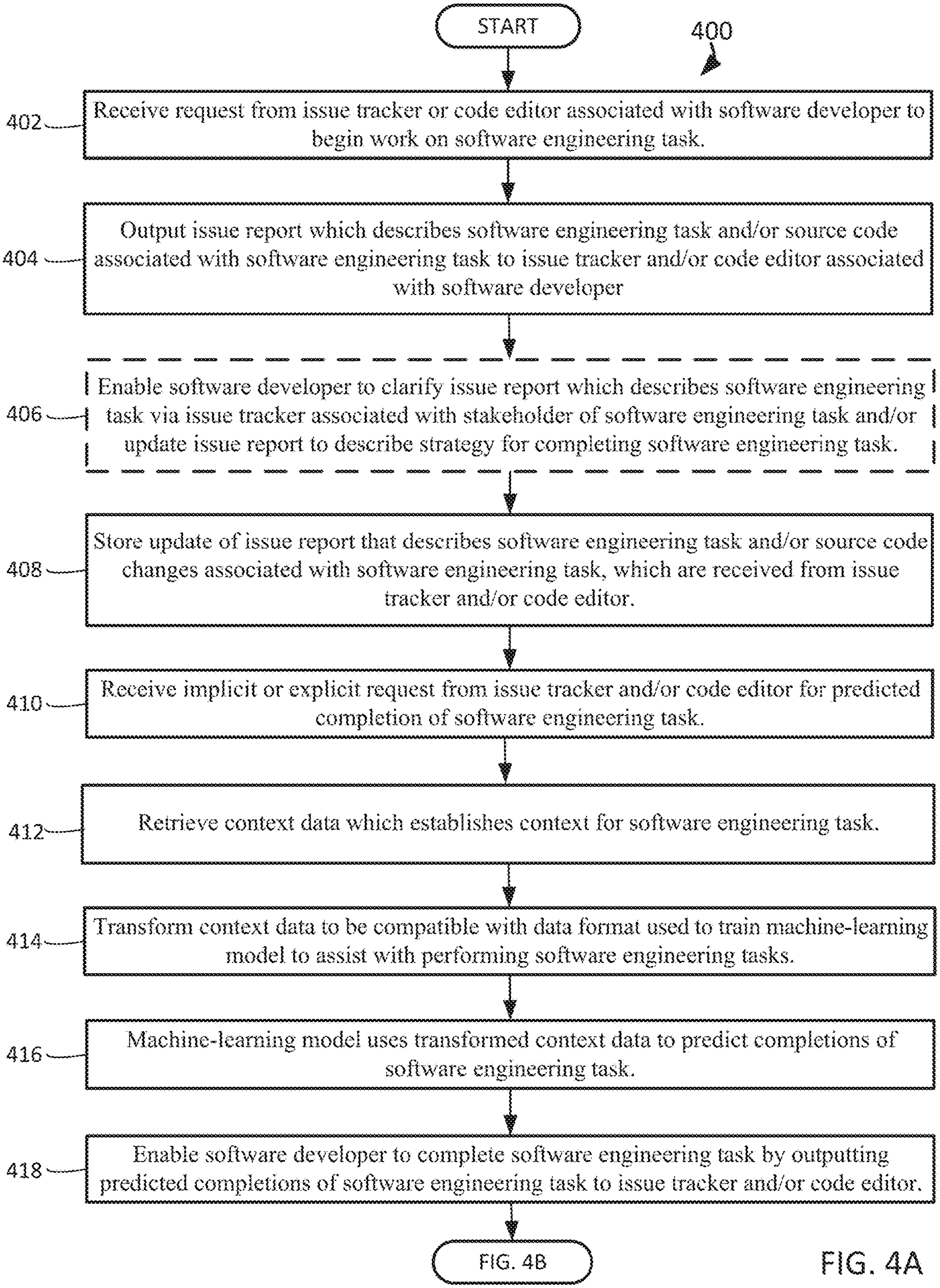
FIG. 4A and FIG. 4B depict a flowchart that illustrates a method that uses a machine-learning model to assist with performing software engineering tasks, under an embodiment.
Figure 4B:
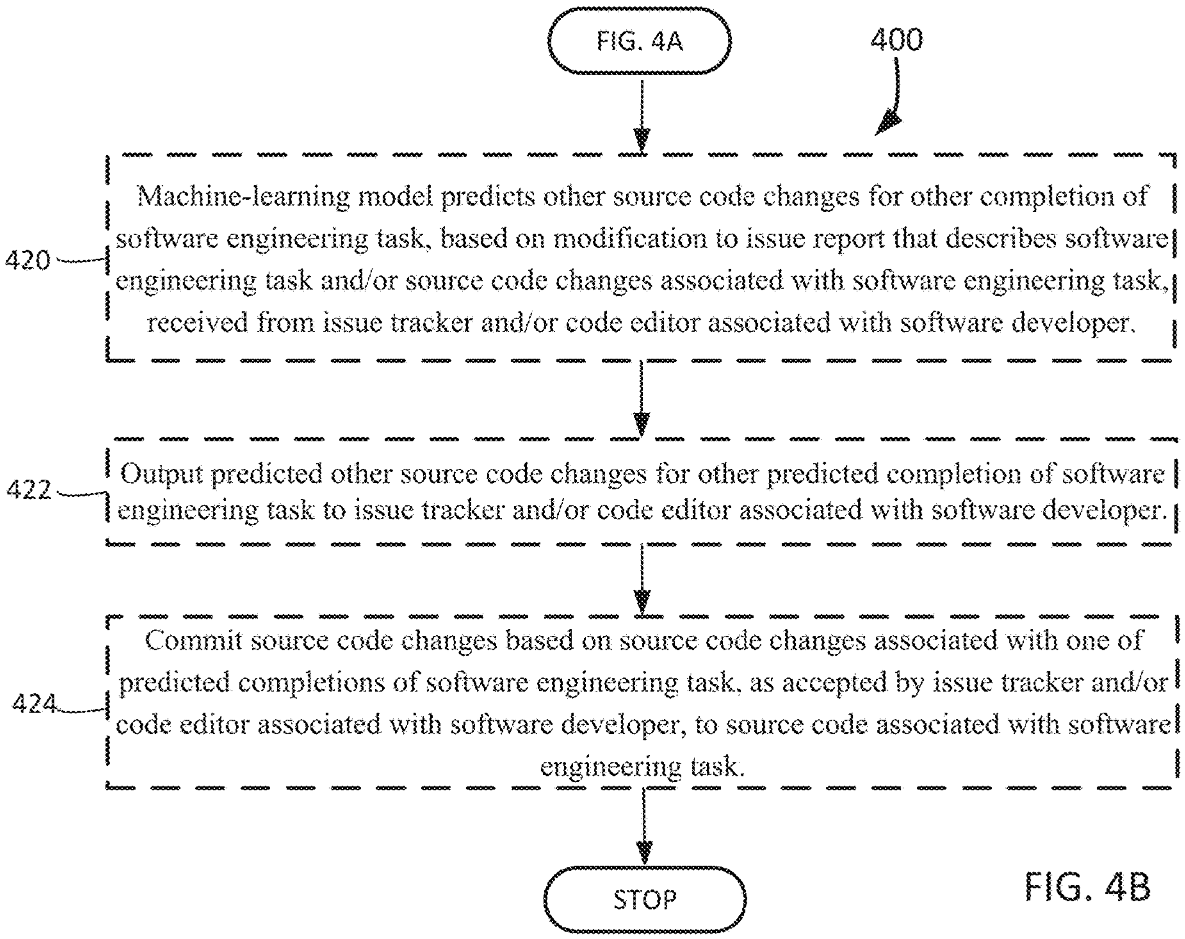

FIG. 4 is a flowchart that illustrates a method that uses the machine-learning model(s) to assist with performing software engineering tasks, under an embodiment. Flowchart 400 illustrates method acts illustrated as flowchart blocks for certain steps involved in and/or between the clients 202-204 and/or the servers 206-208 of FIG. 2.

After a system such as an issue tracking system assigns a software engineering task to a software developer, the software developer logs onto the issue tracker 216 on the client 202 and begins to read the task description. A system receives a request from a code editor or an issue tracker associated with a software developer to begin working on a software engineering task, block 402. The system stores source code and issue reports for software engineering tasks. For example, and without limitation, this may include the agent 244 receiving a request from the code editor 212 or the issue tracker 216 on the client 202 of the software developer named Sofia to begin working on the software engineering task to fix a body validation error response and remove a variable name when it is not embedded, by writing source code or editing an issue report.

A request can be a message asking for information or resources. A software developer can be a person who designs, creates, and/or maintains applications that allow users to perform specific tasks on computers. A code editor can be a tool used for writing software. An issue tracker can be a tool that helps manage and address problems.

After receiving a request from a software developer to begin working on a software engineering task, a system outputs the issue report which describes the software engineering task and/or the source code for the software engineering task to the issue tracker and/or the code editor associated with the software developer, block 404. The system provides source code and issue reports to software developers. By way of example, and without limitation, this may include the agent 244 outputting the issue report and/or the source code, for the software engineering task to fix the body validation error response and remove a variable name when it is not embedded, to Sofia.

Following the optional outputting of an issue report to a software developer, the system optionally enables the software developer to clarify the issue report which describes the software engineering task via an issue tracker associated with a stakeholder of the software engineering task and/or update the issue report to describe a strategy for completing the software engineering task, block 406. The system enables updates to issue reports which describe software engineering tasks. In embodiments, this may include the agent 244 enabling Sofia to communicate with the issue tracker 224 on the client 204 of Stacy Holder, a stakeholder for the software engineering task to fix the body validation error response and remove a variable name when it is not embedded. Sofia and Stacey agree on a high, but not the highest, priority for the software engineering task to fix the body validation error response and remove a variable name when it is not embedded.

A stakeholder can be a person with an interest or concern in something, especially a business. A strategy can be a plan of action or policy designed to achieve a major or overall aim.

Having optionally clarified an issue report, the system stores any updates of the issue report which describes the software engineering task and/or any source code for the software engineering task, which are received from an issue tracker and/or a code editor associated with a software developer, block 408. The system stores any updates to source code and issue reports for software engineering tasks. For example, and without limitation, this may include the agent 244 storing Sofia's updates, which include a high, but not the highest, priority for the software engineering task to fix the body validation error response and remove a variable name when it is not embedded, and the limited amount of Sofia's source code changes, to the dynamic data pipeline 232. An update can be a replacement of an older version with a newer version.

After outputting the issue report and/or the source code for a software engineering task to a software developer, a system receives an implicit or explicit request from the issue tracker or the code editor of the software developer to predict completions of the software engineering task, block 410. The system is requested to predict source code for software engineering tasks. By way of example, and without limitation, this may include the agent 244 receiving an explicit request from Sofia's issue tracker 216 or code editor 212 for predicted completions of the software engineering task to fix the body validation error response and remove a variable name when it is not embedded.

An explicit request can be a message which obviously asks for information or resources. An implicit request can be a message which implies asking for information or resources. A completion can be the action of finishing an action, activity, or process.

In addition to receiving an explicit request to predict completions of a software engineering task, the agent 244 can identify an implicit request to predict completions of software engineering tasks. For example, Sofia initiates her issue tracker 216 and begins editing the issue report for the software engineering task to fix the body validation error response and remove a variable name when it is not embedded, and/or initiates her code editor 212 and begins writing source code for the software engineering task to fix the body validation error response and remove a variable name when it is not embedded, and then stops and waits when the agent 244 informs her that a continued lack of editing activity while a displayed timer counts down without interruption will result in the machine-learning model(s) 242 predicting completions of the software engineering task to fix the body validation error response and remove a variable name when it is not embedded, based on the software engineering task's issue report and source code.

Following receipt of a request to predict completions of a software engineering task, the system retrieves context data which establishes a context for the software engineering task, block 412. The system retrieves context data for a software engineering task to accurately predict the software engineering task. In embodiments, this may include the agent 244 retrieving context data which establishes the software engineering task's context from the dynamic data pipeline 232, such as the description to fix the body validation error response and remove a variable name when it is not embedded and the updates to the issue report, which are for a high, but not the highest, priority for the software engineering task to fix the body validation error response and remove a variable name when it is not embedded, and Sofia's source code changes, from the dynamic data pipeline 240. A context can be the circumstances that form the setting for an action. Context data can be information about the circumstances that form the setting for an action, and which have been translated into a form that is efficient for movement or processing.

Having retrieved context data which establishes a software engineering task's context, the system transforms the context data to be compatible with a data format used to train a machine-learning model(s) to assist with performing software engineering tasks, block 414. The system transforms a software engineering task's context data to be in the format used to predict for the software engineering task. For example, and without limitation, this may include the agent 244 transforming the retrieved issue report and source code changes to be compatible with the data format used to train the machine-learning model(s) 230 to learn to predict completions of software engineering tasks.

After the system transforms the formats of various types of context data for a software engineering task, a machine-learning model(s) uses the transformed context data to predict completions of the software engineering task, block 416. The system uses transformed data to predict source code for software engineering tasks. By way of example, and without limitation, this may include the machine-learning model(s) 242 using the transformed context data to predict a first set of source code changes which has a prediction confidence level of 95% for the software engineering task to fix the body validation error response and remove a variable name when it is not embedded, and a second set of source code changes which has a prediction confidence level of 90% for the software engineering task to fix the body validation error response and remove a variable name when it is not embedded. Transformed context data can be information about the circumstances that form the setting for an action, and which has been converted from one format to another format that is efficient for movement or processing.

Predicting zero completions of a software engineering task may indicate that the machine-learning model(s) is unable to service the software engineering task or a lack of any predicted completion of the software engineering task having a prediction confidence level above a threshold. For example, the machine-learning model(s) 242 may predict no completions of the software engineering task to fix the body validation error response and remove a variable name when it is not embedded if none of the initially determined completions has a prediction confidence level above the threshold of 50%.

A lack can be an absence. A predicted completion can be a forecast of an action for finishing an action, activity, or process. A prediction confidence level can be a probability that a forecast is accurate. A threshold can be the intensity or value of a signal that will produce a response or specified effect:

Predicting multiple completions of a software engineering task may indicate that multiple predicted completions of the software engineering task have a corresponding prediction confidence level above a threshold. Each of the multiple completions of the software engineering task that has a prediction confidence level above the threshold may be interpreted as a reasonable alternative.

Following the predicting of completions of a software engineering task, the system enables a software developer to complete a software engineering task by outputting the predicted completions of the software engineering task to the code editor or issue tracker associated with the software developer, block 418. The system outputs predicted completions of a software engineering task. In embodiments, this may include the agent 244 outputting the two distinct sets of predicted completions of the software engineering task to fix the body validation error response and remove a variable name when it is not embedded, within or beside the issue tracker 216, with each predicted completion depicted in the form of a difference, a compact representation of the possibly many source code changes that the machine-learning model(s) 242 has analyzed as being capable of accomplishing the software engineering task and has a prediction confidence level above a threshold.

In addition to enabling Sofia to complete a software engineering task, the machine-learning model(s) 242 can provide multiple alternative sets of predicted source code changes that have sufficiently high prediction confidence levels to be reasonable alternatives for completions to the software engineering task, from which Sofia can select any of the sets of predicted source code changes to be committed. Since the sets of predicted source code changes are low-level implementations of a completion of a software engineering task, and the agent 244 is outputting the predicted source code changes to Sofia's high-level issue tracker 216, the predicted source code changes may be depicted as a compact representation of all of a set of predicted source code changes for each predicted completion of the software engineering task. When Sofia uses her high-level issue tracker 216 to review the compact representations of all of a set of predicted source code changes for any predicted completion of the software engineering task, the selection of an individual representation causes the agent 244 to expand the selected representation to provide Sofia with a complete section of the selected source code change within the context of the existing source code, such as the predicted source code changes at line 651 in the lines of source code 108 depicted by FIG. 1A.

Having predicted source code changes for multiple completions of a software engineering task, the machine-learning model(s) optionally predicts other source code changes for another completion of the software engineering task, based on a modification to the issue report which describes the software engineering task and/or the source code changes associated with the software engineering task, received from the issue tracker and/or the code editor associated with the software developer, block 420. For example, and without limitation, this may include the machine-learning model(s) 242 responding to Sofia modifying the issue report for the software engineering task to fix the body validation error response and remove a variable name when it is not embedded, to specify that she completed the source code changes for removing a variable name when it is not embedded by selecting a predicted completion of her software engineering task, and using such a modification as context data for predicting other source code changes for another completion of the software engineering task, but only to fix the body validation error response, without removing a variable name that is embedded. A modification can be a change.

After an optional prediction of other source code changes for another completion of the software engineering task, the system optionally outputs the other predicted source code changes for the other completion of the software engineering task to the source code editor and/or the issue tracker associated with the software developer, block 422. The system responds to a modification of the issue report and/or the source code for a software engineering task by outputting new predictions for the software engineering task. For example, and without limitation, this can include the agent 244 outputting the predicted other source code changes for another completion of the software engineering task, but only to fix the body validation error response, without removing a variable name that is embedded, to Sofia.

Following the output of all predicted source code changes, the system optionally commits the source code changes based on the predicted source code changes associated with one of the completions of the software engineering task, as accepted by the code editor and/or the issue tracker associated with the software developer, to source code associated with the software engineering task, block 424. The system commits predicted source code as accepted by the software developer. By way of example, and without limitation, this may include the agent 244 committing the predicted source code changes for the completion which Sofia accepted, to the software engineering task's source code control repository and closes the software engineering task on the Sofia's behalf. Predicted source code changes can be a forecast of modifications to a text listing of commands to be compiled or assembled into an executable computer program.

The source code changes may include source code to be added to the source code associated with the software engineering task, source code to be removed from the source code associated with the software engineering task, and/or source code to be replaced at the source code associated with the software engineering task. In addition to enabling Sofia to complete a software engineering task, the machine-learning model(s) 242 can provide multiple alternative sets of predicted source code changes that have sufficiently high prediction confidence levels to be reasonable alternatives for completions to the software engineering task, from which Sofia can select any of the sets of predicted source code changes to be committed Although FIG. 4 depicts the blocks 402-424 occurring in a specific order, the blocks 402-424 may occur in another order. In other implementations, each of the blocks 402-424 may also be executed in combination with other blocks and/or some blocks may be divided into a different set of blocks.

The agent 244 presents the predictions or suggestions by the machine-learning model(s) 242 through one or more software tools. A software developer's user experience need not be fully specified within this general architecture, and its ideal form may depend on many factors, including but not limited to the individual preferences of the software developer, the specific types of tasks being performed within this general framework, or the effectiveness and/or accuracy of a particular instantiation of the machine-learning model(s) 242.

In its general form, the machine-learning model(s) 242 is capable of reading many types of software engineering data and making predictions of their ideal forms. While most instantiations focus on making predictions of what source code should be written, thereby automating the work of a software developer, some instantiations may work directly in natural language issue reports, and/or project requirements and/or specifications. Software developer work is greatly facilitated by clear and accurate natural language issue reports, and/or project requirements and/or specifications. A natural language-focused instantiation of a tool would be presented directly within the issue-tracking system such as the writing assistant 218 and/or 226 that may be able to assist a project stakeholder with this process.

Figure 5A:
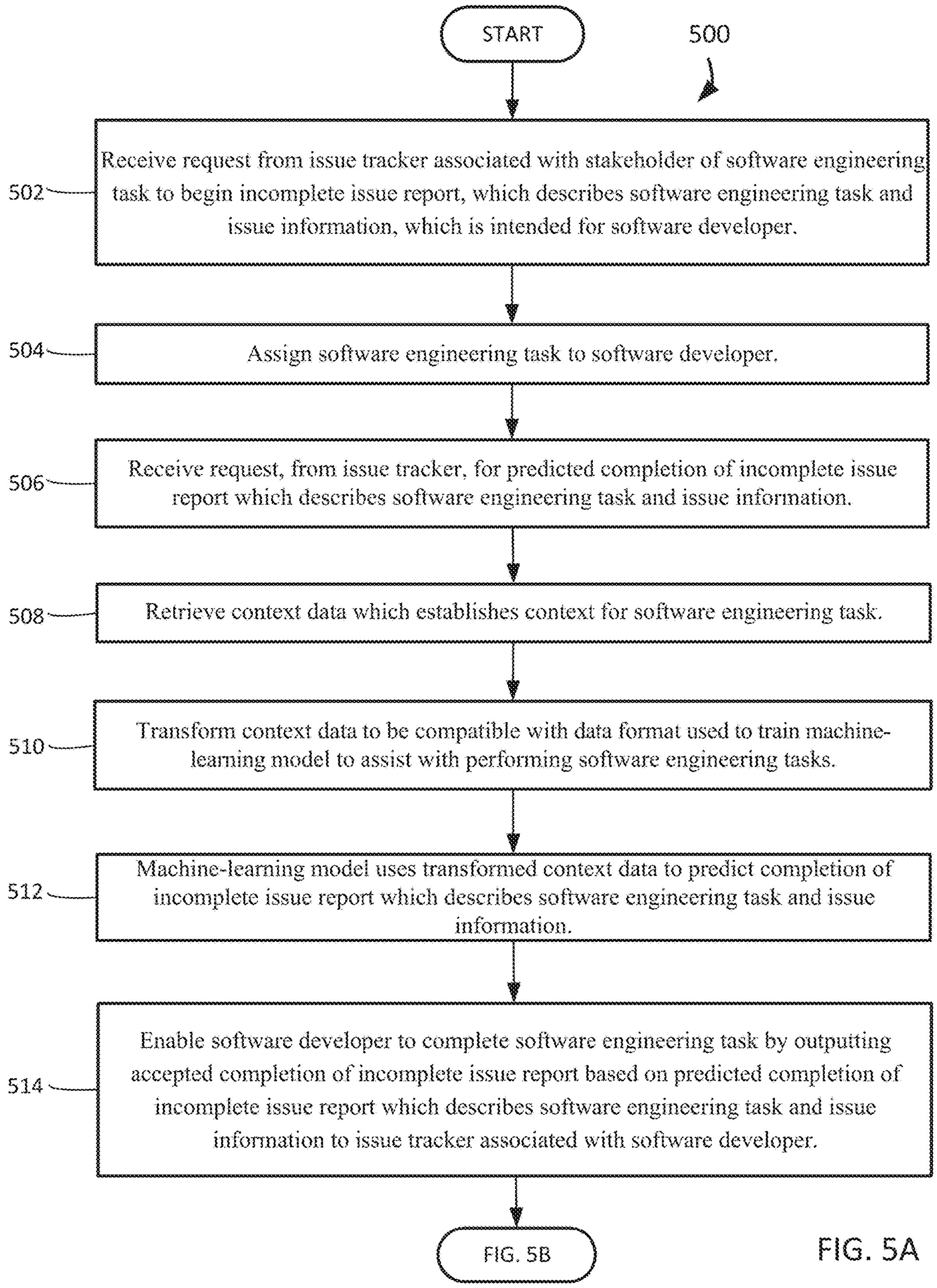
FIG. 5A and FIG. 5B depict a flowchart that illustrates a method that assists with writing issue reports that describe software engineering tasks and issue information, under an embodiment.
Figure 5B:
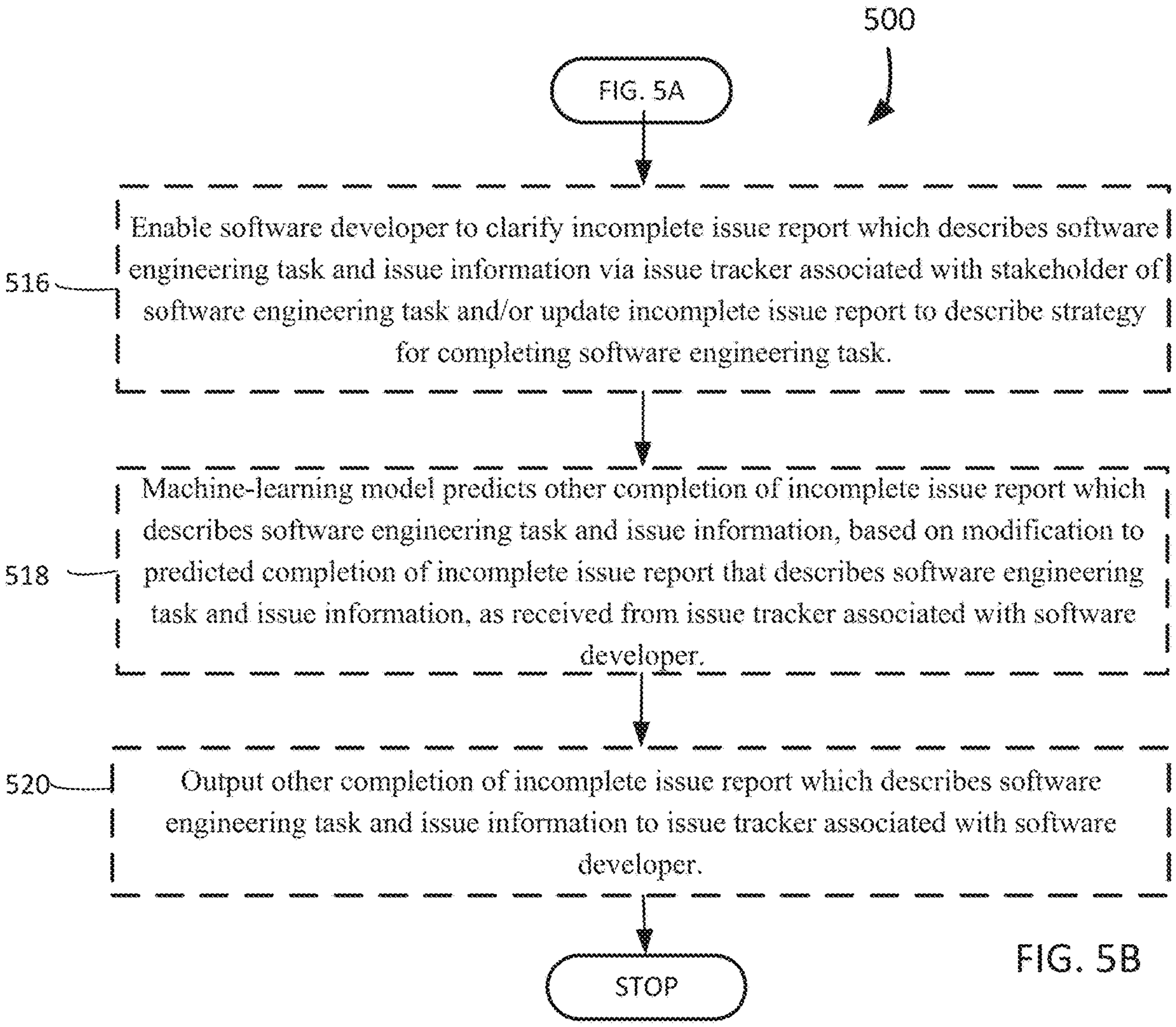

FIG. 5 is a flowchart that illustrates a method that assists with writing issue reports that describe software engineering tasks and issue information, under an embodiment. Flowchart 500 illustrates method acts illustrated as flowchart blocks for certain steps involved in and/or between the clients 202-206 and/or the servers 206-208 of FIG. 2.

A system receives a request, from an issue tracker associated with a stakeholder of a software engineering task, to begin an incomplete issue report, which describes the software engineering task and issue information, and which is intended for the software developer, block 502. The system stores source code and issue reports for software engineering tasks. For example, and without limitation, this may include the agent 244 receiving a request from a stakeholder named Stacy Holder, who is using her issue tracker 224 to create a new issue report for a software engineering task to fix a body validation error response, and begins to fill in a text description of the work she desires a software developer named Sofia to perform. An incomplete issue report can be an unfinished text account that describes a problem. Issue information can be facts specified or learned about a problem.

After beginning an incomplete issue report which describes a software engineering task, the system assigns the software engineering task to a software developer, block 504. The system provides source code and issue reports to software developers. By way of example, and without limitation, this may include the agent 244 assigning the software engineering task to fix the body validation error response to Sofia.

Following the assignment of the software engineering task, the system receives a request from an issue tracker associated with a stakeholder to predict a completion of the incomplete issue report which describes the software engineering task and issue information, block 506. The system receives requests to predict completions of incomplete issue reports. In embodiments, this may include the agent 244 responding to a deliberate button press on the issue tracker 224 by receiving Stacy's request to predict the completion of the incomplete issue report for the software engineering task to fix the body validation error response.

In addition to receiving an explicit request to predict a completion of an incomplete issue report, the agent 244 can identify an implicit request to predict a completion of an incomplete issue report. For example, Stacy initiates her issue tracker 224 and begins an incomplete issue report which describes a software engineering task, and then stops and waits when the agent 244 informs her that a continued lack of editing activity while a displayed timer counts down without interruption will result in the machine-learning model(s) 242 predicting a completion of the incomplete issue report based on whatever edits that Stacy had made to the incomplete issue report.

Having received a request to predict a completion of an incomplete issue report, the system retrieves context data which establishes a context for the software engineering task, block 508. The system retrieves software engineering tasks' context data for making predictions about the software engineering tasks. For example, and without limitation, this may include the agent 244 retrieving the incomplete issue report for the software engineering task to fix the body validation error response and the already existing source code for the body validation error response as context data for the software engineering task to fix the body validation error response, from the dynamic data pipeline 240.

After retrieving context data which establishes a software engineering task's context, the system transforms the context data to be compatible with the data format used to train a machine-learning model(s) to assist with software engineering tasks, block 510. The system transforms context data to enable predictions about software engineering tasks. By way of example, and without limitation, this may include the agent 244 transforming the context data for the software engineering task to fix the body validation error response and the source code for the software engineering task to fix the body validation error response to be compatible with the data format used to train a machine-learning model(s) 230 to predict completions of incomplete issue reports that describe software engineering tasks.

Following the transforming of context data for a software engineering task to be in the compatible format used for training the machine-learning model(s), the machine-learning model(s) uses the transformed context data to predict the completion of the incomplete issue report which describes the software engineering task and the issue information, block 512. The system makes predictions about software engineering tasks. In embodiments, this may include the machine-learning model(s) 242 using the transformed context data to predict the completion of the incomplete issue report for the software engineering task to fix the body validation error response that corrects the description of the software engineering task to require the removal of a variable name when it is not embedded, instead of the incorrect description of the software engineering task requiring the removal of a variable name when it is not omitted.

Having used transformed context data to predict a completion of an incomplete issue report that describes a software engineering task, the system enables a software developer to complete the software engineering task by outputting an accepted completion of the incomplete issue report based on the predicted completion of the incomplete issue report, which describes the software engineering task and the issue information, to an issue tracker associated with the software developer, block 514. The system enables software developers to complete software engineering tasks. For example, and without limitation, this may include the agent 244 enabling Sofia to more readily and quickly complete her assigned software engineering task, by outputting the enhanced description provided by the predicted completion of the incomplete issue report for the software engineering task to fix the body validation error response. The predicted completion of the incomplete issue report corrects the description of the software engineering task to require the removal of a variable name when it is not embedded, instead of the incorrect description of the software engineering task requiring the removal of a variable name when it is not omitted. An accepted completion can be a selected action of finishing an action, activity, or process.

Outputting the accepted completion of the incomplete issue report may include identifying at least one of a deletion or a replacement of a part of the incomplete issue report. For example, when the agent 244 outputs the predicted completion of the incomplete issue report for the software engineering task to fix the body validation error response, the incorrect description of the software engineering task, which incorrectly described requiring the removal of a variable name when it is not omitted, is revised by a strike-through line that identifies the proposed deletion of the word "omitted" and a proposed replacement with the word "embedded." A deletion can be the removal of data from a computer. A replacement can be a substitution of one entity for another entity. A part can be a piece of something such as an object, which combined with other pieces makes up the whole. In addition to the machine-learning model(s) 242 being trained to predict source code changes for software engineering tasks, the machine-learning model(s) has been trained on a sufficient variety of issue reports to be able to predict the completion of an incomplete issue report, which can require the deleting and/or the replacing of part of the incomplete issue report, such as the deletion/replacement of the word "omitted" which was erroneously included in the software engineering task.

An accepted completion of an incomplete issue report may be based on at least one edit to a predicted completion of the incomplete issue report, which describes a software engineering task and issue information, from an issue tracker associated with a stakeholder, and the issue information may include whether an issue is reproducible, a requirement to reproduce the issue, and/or a current priority associated with the issue. For example, Stacy reviews the predicted completion of the incomplete issue report, and notices references to several items still missing from the incomplete issue report that will be of importance to the Sofia, such as whether or not the issue is reliably reproducible, steps to reproduce the issue, and how high of a priority the issue currently is. Therefore, Stacy accepts the predicted completion of the incomplete issue report, and edits the generated text to specify that this issue is reproducible, the steps required to reproduce the issue, and the high, but not the highest, priority for the software engineering task to fix the body validation error response.

An edit can be a change to a text. An issue can be a problem. Reproducible can be the ability to be shown, done, or made again. A current priority can be the present fact or condition of being regarded or treated as more important than others.

In addition to enabling a software developer to complete a software engineering task, the system optionally enables the software developer to clarify an incomplete issue report which describes the software engineering task via an issue tracker associated with a stakeholder and/or update the incomplete issue report to describe a strategy for completing the software engineering task, block 516. The system enables the clarifying and the updating of incomplete issue reports. By way of example, and without limitation, this may include the agent 244 enabling Sofia to contact Stacy through their respective issue trackers 216 and 224, to clarify exactly how to take the second step required to reproduce the otherwise occasionally occurring problem with the body validation error response, and recording this clarifying detail as part of the incomplete issue report.

After predicting a completion of an incomplete issue report, a machine-learning model(s) optionally predicts another completion of the incomplete issue report which describes a software engineering task and issue information, based on a modification of the predicted completion of the incomplete issue report which describes the software engineering task and the issue information, as received from an issue tracker associated with a software developer, block 518. The system can revise predictions of completions of incomplete issue reports. In embodiments, this may include the machine-learning model(s) 242 revising the predicted completion of the incomplete issue report to require the software engineering task to only to fix the body validation error response without removing a variable name that is embedded, because Sofia modified the incomplete issue report to indicate that she had completed the removal of a variable name when it is not embedded in the body validation error response.

Following the optional predicting of another completion of an incomplete issue report, the system can output the other completion of the incomplete issue report, which describes a software engineering task and issue information, to an issue tracker associated with a software developer, block 520. The system outputs revised predictions of completions of incomplete issue reports. For example, and without limitation, this may include the agent 244 outputting the new prediction of the completion of the incomplete issue report, which only requires the software engineering task to fix the body validation error response, without removing a variable name that is embedded, to Sofia's issue tracker 216.

Although FIG. 5 depicts the blocks 502-520 occurring in a specific order, the blocks 502-520 may occur in another order. In other implementations, each of the blocks 502-520 may also be executed in combination with other blocks and/or some blocks may be divided into a different set of blocks.

This framework's most general tool instantiation is to enable a software developer to automatically perform a general software engineering task given its natural language description and surrounding software-related data. This software developer interface may be presented beside or within the system through which a software developer is assigned work. For example, many software developers receive their tasks through issue tracking systems, which often serve project management duties as well. In this instantiation, the software developer's user experience could appear as the method described in the flowchart of FIG. 6.

Figure 6A:
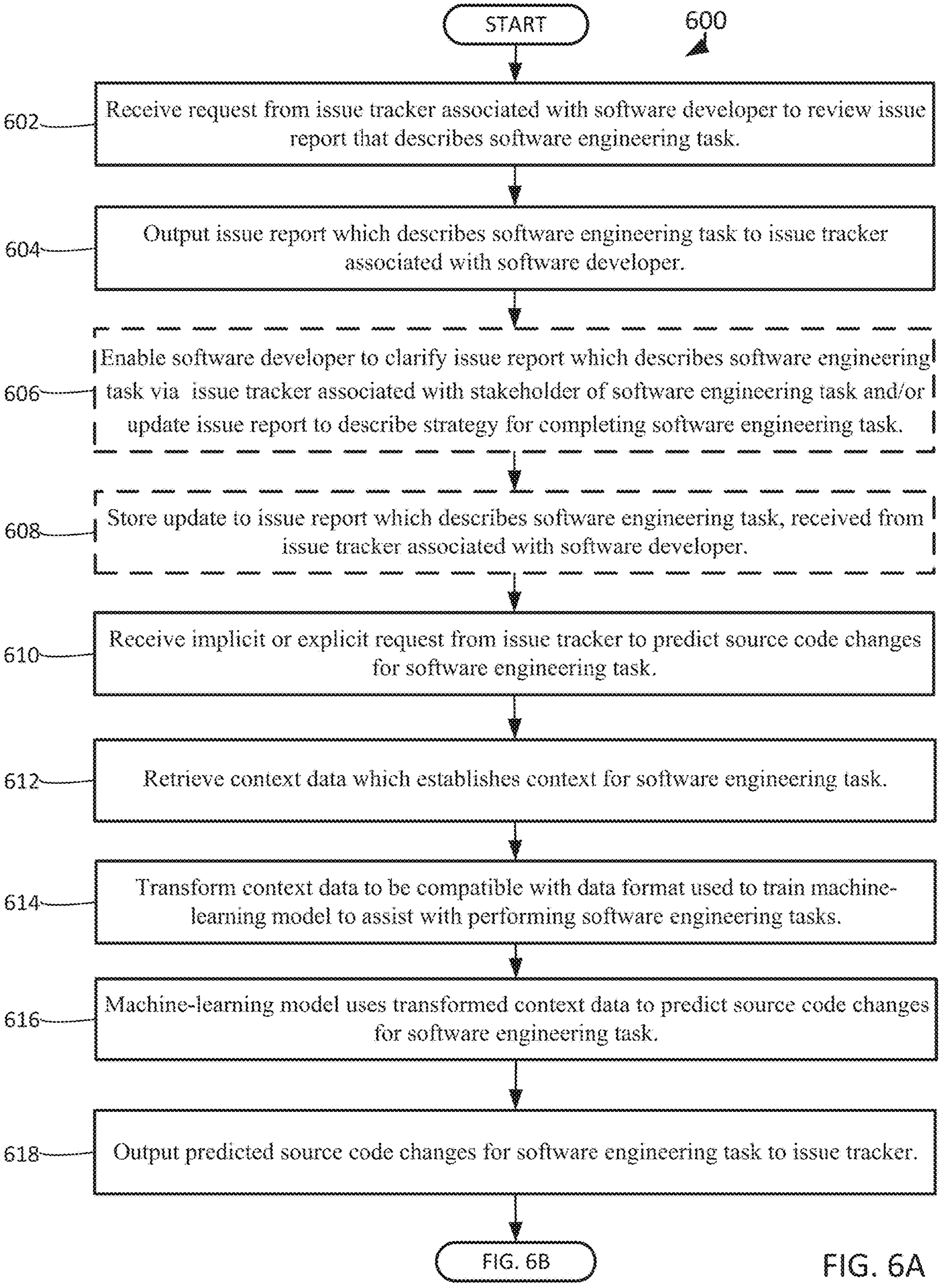
FIG. 6A and FIG. 6B depict a flowchart that illustrates a method that assists with automating software engineering tasks, under an embodiment.
Figure 6B:
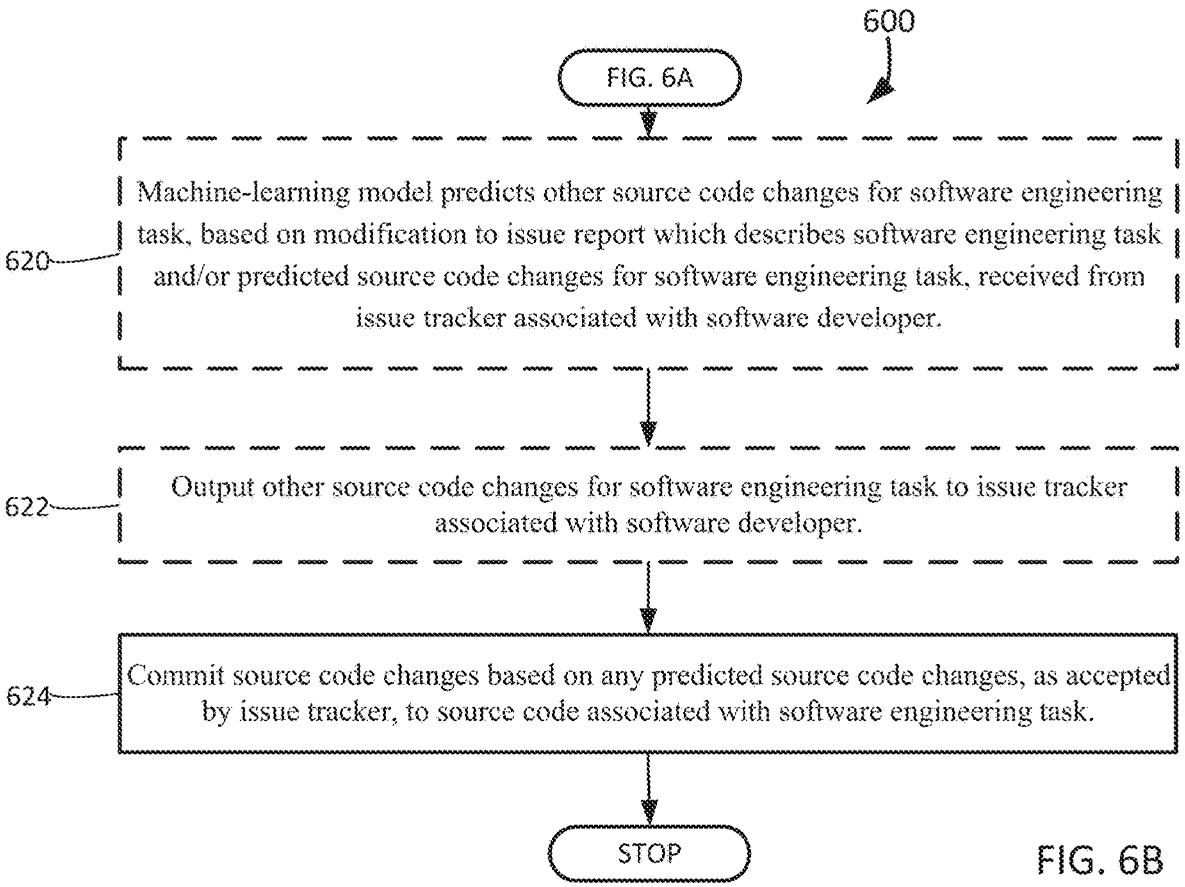

FIG. 6 is a flowchart that illustrates a method that assists with automating software engineering tasks, under an embodiment. Flowchart 600 illustrates method acts illustrated as flowchart blocks for certain steps involved in and/or between the clients 202-204 and/or the servers 206-208 of FIG. 2.

After a system such as an issue tracking system assigns a software engineering task to a software developer, the software developer logs onto the issue tracker 216 on the client 202 and begins to read the issue report which describes the software engineering task. A system receives a request from an issue tracker associated with a software developer to review an issue report which describes a software engineering task, block 602. The system stores source code and issue reports for software engineering tasks. For example, and without limitation, this may include the agent 244 receiving a request from the issue tracker 216 on the client 202 of a software developer named Sofia to review the issue report which describes the software engineering task to fix a body validation error response and remove a variable name when it is not embedded.

After receiving a request from a software developer's issue tracker to review an issue report, a system outputs the issue report which describes the software engineering task to the issue tracker associated with the software developer, block 604. The system provides source code and issue reports to software developers. By way of example, and without limitation, this may include the agent 244 outputting the issue report which describes the software engineering task to fix the body validation error response and remove a variable name when it is not embedded, to Sofia's issue tracker 216.

Following the outputting of an issue report to a software developer, the system optionally enables the software developer to clarify the issue report which describes the software engineering task via an issue tracker associated with a stakeholder of the software engineering task and/or update the issue report to describe a strategy for completing the software engineering task, block 606. The system enables updates to issue reports which describe software engineering tasks. In embodiments, this may include the agent 244 enabling Sofia to communicate with the issue tracker 216 on the client 204 of Stacy Holder, a stakeholder for the software engineering task for clarifying the issue report for the software engineering task to fix the body validation error response and remove a variable name when it is not embedded. Sofia and Stacey agree on a high, but not the highest, priority for the software engineering task to fix the body validation error response and remove a variable name when it is not embedded.

Having optionally clarified an issue report, the system optionally stores any update of the issue report with describes a software engineering task, received from an issue tracker associated with a software developer, block 608. The stores any updates to source code and issue reports for software engineering tasks. For example, and without limitation, this may include the agent 244 storing Sofia's update, which is for a high, but not the highest, priority for the software engineering task to fix the body validation error response and remove a variable name when it is not embedded, to the dynamic data pipeline 240.

After outputting an issue report which describes a software engineering task to a software developer's issue tracker, the system receives an implicit or explicit request from the issue tracker associated with the software developer to predict source code changes for the software engineering task, block 610. The system is requested to predict source code for software engineering tasks. By way of example, and without limitation, this may include the agent 244 receiving an explicit request from a button pressed on Sofia's issue tracker 216 for predicted source code changes for the software engineering task to fix the body validation error response and remove a variable name when it is not embedded.

In addition to receiving an explicit request to predict source code changes for a software engineering task, the agent 244 can identify an implicit request to predict source code changes for a software engineering task. For example, Sofia initiates her issue tracker 216 and begins updating the issue report which describes the software engineering task to fix the body validation error response and remove a variable name when it is not embedded, and then stops and waits when the agent 244 informs her that a continued lack of editing activity while a displayed timer counts down without interruption will result in the machine-learning model(s) 242 predicting source code changes based on whatever modifications that Sofia had made to the issue report which describes the software engineering task to fix the body validation error response and remove a variable name when it is not embedded.

Following receipt of a request to predict source code changes for a software engineering task, the system retrieves context data which establishes a context for the software engineering task, block 612. The system retrieves context data for a software engineering task to accurately predict for the software engineering task. In embodiments, this may include the agent 244 retrieving context data which establishes the software engineering task's context from the dynamic data pipeline 240, such as the description to fix the body validation error response and remove a variable name when it is not embedded, and the updates to the issue report, which are for a high, but not the highest, priority for the software engineering task to fix the body validation error response and remove a variable name when it is not embedded.

Having retrieved context data which establishes a software engineering task's context, the system transforms the context data to be compatible with a data format used to train a machine-learning model(s) to assist with performing software engineering tasks, block 614. The system transforms a software engineering task's context data to be in the format used to predict for the software engineering task. For example, and without limitation, this may include the agent 244 transforming the retrieved issue reports for the software engineering task to be compatible with the data format used to train the machine-learning model(s) 230 to learn to predict source code changes for software engineering tasks.

Having the system transformed various types of context data for a software engineering task, the machine-learning model(s) uses the transformed context data to predict source code changes for a software engineering task, block 616. The system uses transformed issue reports to predict the source code changes for a software engineering task. By way of example, and without limitation, this may include the machine-learning model(s) 242 using the transformed context data to predict the source code changes, such as the new source code at line 651 in the lines of source code 108 depicted by FIG. 1A. The source code changes may include a) new source code to be added to the source code associated with the software engineering task, b) some existing source code to be removed from the source code associated with the software engineering task, and/or c) new source code to replace some of the source code associated with the software engineering task.

After predicting source code changes for a software engineering task, the system outputs the predicted source code changes for a software engineering task to an issue tracker associated with a software developer, block 618. The system outputs predicted source code changes for a software engineering task. In embodiments, this may include the agent 244 outputting the predicted source code changes, which include the new source code at line 651 in the lines of source code 108 depicted by FIG. 1A, for a software engineering task to Sofia's issue tracker 216.

These predicted or suggested source code changes may be presented within or beside the issue tracker 216 in the form of a difference, a compact representation of the possibly many source code changes that the machine-learning model (s) 242 has analyzed as being capable of completing the software engineering task. Since the predicted source code changes are low-level implementations for a completion of a software engineering task, and the agent 244 is outputting the predicted source code changes to Sofia's high-level issue tracker 216, the predicted source code is depicted as a compact representation of the predicted source code changes for the software engineering task. When Sofia uses her high-level issue tracker 216 to review the compact representations of predicted source code changes for the software engineering task, the selection of an individual representation causes the agent 244 to expand the selected representation to provide Sofia with a complete section of the predicted source code within the context of the existing source code, such as the predicted source code changes at line 651 in the lines of source code 108 depicted by FIG. 1A.

After predicting source code changes for a software engineering task, the machine-learning model(s) optionally predicts other source code changes for the software engineering task, based on a modification to the issue report which describes the software engineering task and/or the source code for the software engineering task, as received from the issue tracker associated with the software developer, block 620. The system responds to a modification of the issue report and/or the source code for a software engineering task by making new predictions for the software engineering task. In embodiments, this may include the machine-learning model(s) 242 responding to Sofia modifying the issue report for the software engineering task to fix the body validation error response and remove a variable name when it is not embedded, to specify that she completed the source code changes for removing a variable name when it is not embedded, and using such a modification as context data for predicting other source code changes for another completion of the software engineering task, but only to fix the body validation error response, without removing a variable name that is embedded.

Following an optional prediction of other source code changes for a software engineering task, the system optionally outputs the other predicted source code changes for the software engineering task to an issue tracker associated with a software developer, block 622. The system responds to a modification of the issue report and/or the source code for a software engineering task by outputting new predictions for the software engineering task. By way of example, and without limitation, this can include the agent 244 outputting the other source code changes for another completion of the software engineering task, but only to fix the body validation error response, without removing a variable name that is embedded.

Having output all predicted source code changes for a software engineering ask, the system commits source code changes based on predicted source code changes, as accepted by an issue tracker, to source code associated with the software engineering task, block 624. The system commits predicted source code as accepted by the software developer. In embodiments, this may include the agent 244 committing the predicted source code changes, which Sofia accepted for removing a variable name that is embedded, to the software engineering task's source code control repository and closes the software engineering task on Sofia's behalf. Even if Sofia worked only on the issue report which describes her software engineering task, without generating any source code changes for the software engineering task, and then requested the predicted source code changes for the software engineering task, the machine-learning model(s) 242 can use the updated issue report to predict every source code change required for completion of the software engineering task, thereby automating the generation of source code changes.

Although FIG. 6 depicts the blocks 602-624 occurring in a specific order, the blocks 602-624 may occur in another order. In other implementations, each of the blocks 602-624 may also be executed in combination with other blocks and/or some blocks may be divided into a different set of blocks.

A software developer may prefer to supervise their automated tools more closely. A further instantiation may reside within a software developer's code editor 212, the word processor-like software that a software developer uses to edit source code. Such a tool may be implemented within the code editor 212 as a plugin that extends the native functionality of the code editor 212. This code editor-focused tool would be focused on helping a software developer write the most appropriate source code that accomplishes the given task.

Figure 7A:
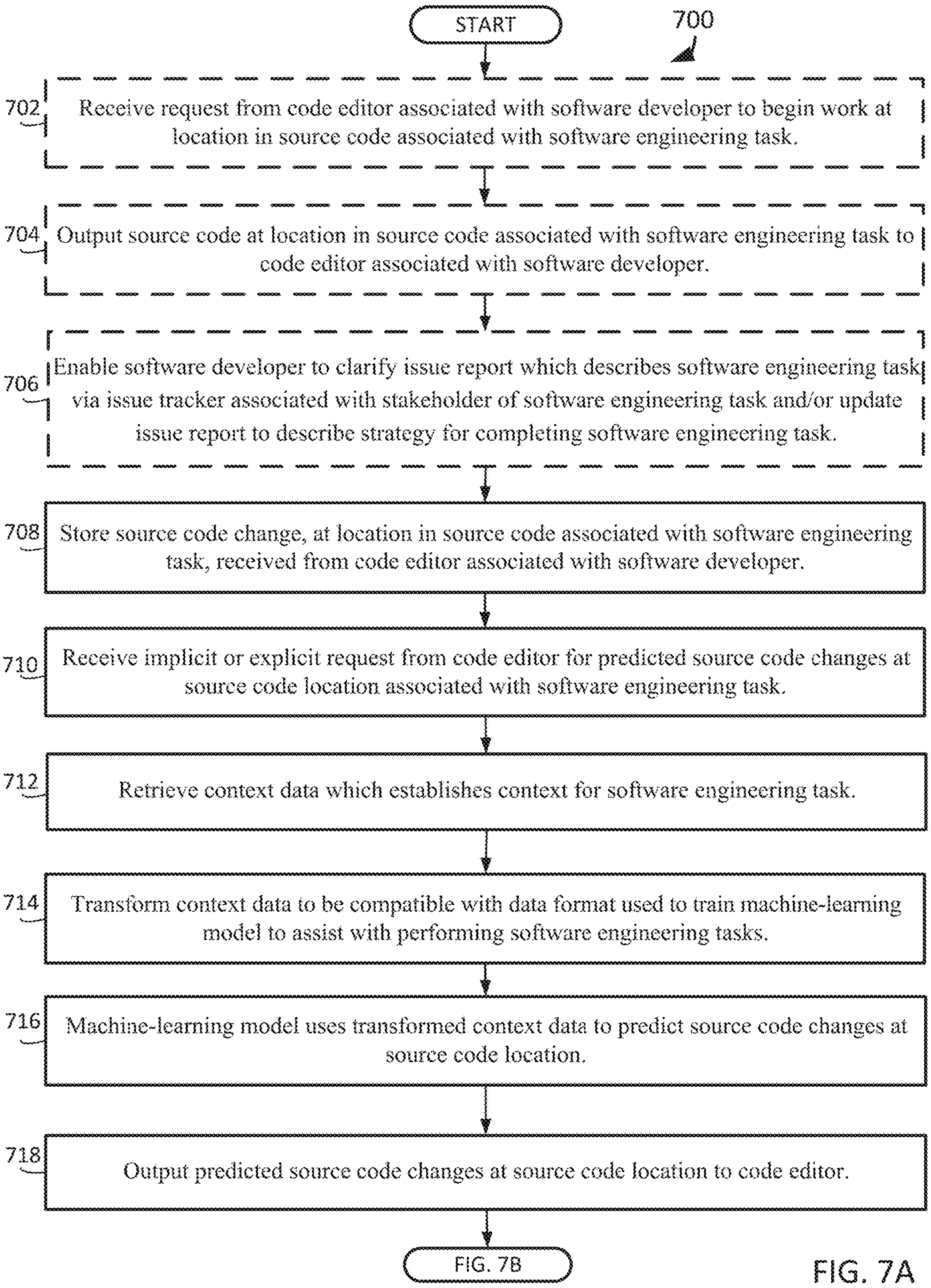
FIG. 7A and FIG. 7B depict a flowchart that illustrates a method that assists with writing source code for software engineering tasks, under an embodiment.
Figure 7B:
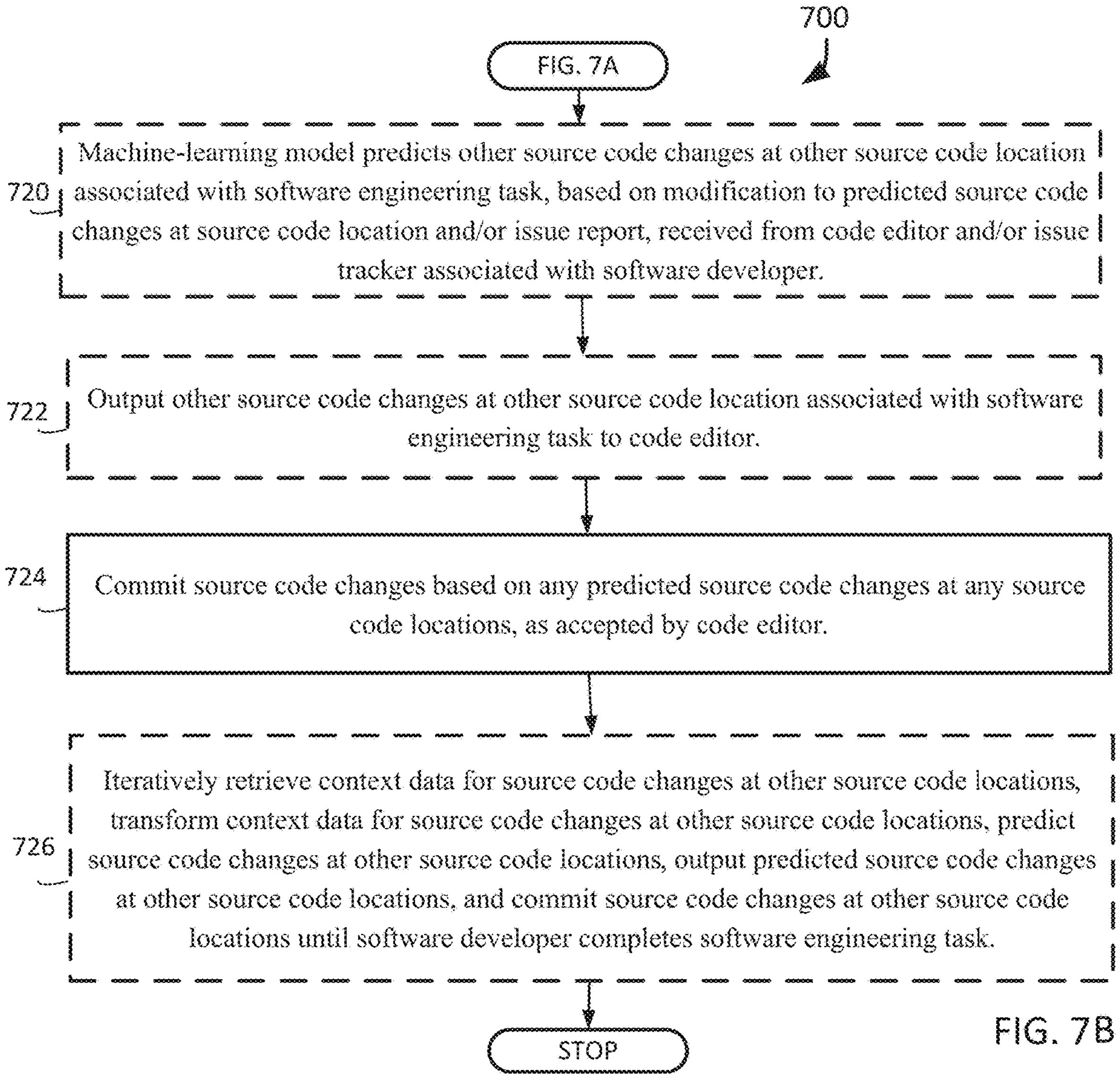

FIG. 7 is a flowchart that illustrates a method that assists with writing code for software engineering tasks, under an embodiment. Flowchart 700 illustrates method acts illustrated as flowchart blocks for certain steps involved in and/or between the clients 202-206 and/or the servers 206-208 of FIG. 2.

After a system such as an issue tracking system assigns a software engineering task to a software developer, the software developer logs onto the issue tracker 216 on the client 202 and begins to read the task description. A system optionally receives a request from a code editor associated with a software developer to begin working at a location in source code associated with a software engineering task, block 702. The system stores source code and issue reports for software engineering tasks. For example, and without limitation, this may include the agent 244 receiving a request from the code editor 212 on the client 202 of a software developer named Sofia, who decides where in the software's source code she wants to begin working on the software engineering task to fix a body validation error response and remove a variable name when it is not embedded. A location can be a region.

After optionally receiving a request from a software developer's code editor to begin working at a source code location associated with a software engineering task, a system optionally outputs the source code at a location in source code associated with the software engineering task, to the code editor associated with the software developer, block 704. The system provides source code and issue reports to software developers. By way of example, and without limitation, this may include the agent 244 outputting a section of source code for the location of source code which begins at line 701 where Sofia has positioned the cursor in her code editor 212.

Following the optional outputting of source code for a software engineering task to a software developer's code editor, the system optionally enables the software developer to clarify an issue report which describes the software engineering task via an issue tracker associated with a stakeholder of the software engineering task and/or update the issue report to describe a strategy for completing the software engineering task, block 706. The system enables updates to issue reports which describe software engineering tasks. In embodiments, this may include the agent 244 enabling Sofia to communicate with the issue tracker 216 on the client 204 of Stacy Holder, a stakeholder for the software engineering task to fix the body validation error response and remove a variable name when it is not embedded. Sofia and Stacey agree on a high, but not the highest, priority for the software engineering task to fix the body validation error response and remove a variable name when it is not embedded.

Having optionally clarified an issue report which describes a software engineering task, the system stores a source code change at a location in source code associated with the software engineering task, received from a code editor associated with a software developer, block 708. The system stores any updates to source code and issue reports for software engineering tasks. For example, and without limitation, this may include the agent 244 storing Sofia's source code changes to line 651 in the source code, where Sofia had been working on the same software engineering task, which are a fraction of the source code changes required to fix the body validation error response and remove a variable name when it is not embedded.

After storing a source code change at a location in source code, a system receives an implicit or explicit request from the code editor for predicted source code changes at a source code location associated with a software engineering ask, block 710. The system is requested to predict source code for software engineering tasks. By way of example, and without limitation, this may include the agent 244 receiving an explicit request from a button pushed on Sofia's code editor 212 for predicted source code changes for the software engineering task at line 701 in the source code where her cursor is currently located. The location in source code may be the same as or different from the source code location, such as after Sofia stored source code changes at one location, she may have remained at the same location or moved on to a new location where she requested the predicted source code changes.

In addition to receiving an explicit request to predict source code changes at the source code location, the agent 244 can identify an implicit request to predict source code changes at the source code location. For example, Sofia uses her code editor 212 and writes source code changes at various source code locations, including line 651, locates her cursor at line 701 in the same source code, and then stops and waits when the agent 244 informs her that a continued lack of coding activity while a displayed timer counts down without interruption will result in the machine-learning model(s) 242 predicting source code changes for the software engineering task at line 701 where her cursor is located. A source code location can be region of a text listing of commands to be compiled or assembled into an executable computer program.

Following receipt of a request to predict source code changes at a source code location associated with a software engineering task, the system retrieves context data which establishes a context for the software engineering task, block 712. The system retrieves context data for a software engineering task to accurately predict for the software engineering task. In embodiments, this may include the agent 244 retrieving context data which establishes the software engineering task's context from the dynamic data pipeline 232, such as Sofia's source code changes at various locations in source code, which are a partial completion of the source code changes required for the software engineering task to fix the body validation error response and remove a variable name when it is not embedded, from the dynamic data pipeline 240.

Having retrieved context data which establishes a software engineering task's context, the system transforms the context data to be compatible with a data format used to train a machine-learning model(s) to assist with performing software engineering tasks, block 714. The system transforms a software engineering task's context data to be in the format used to predict for the software engineering task. For example, and without limitation, this may include the agent 244 transforming the source code changes at the various locations in source code to be compatible with the data format used to train the machine-learning model(s) 230 to predict source code changes for software engineering tasks.

After the system transforms various types of context data for a software engineering task, the machine-learning model(s) uses the transformed context data to predict source code changes at a source code location associated with the software engineering task, block 716. The system uses transformed data to predict source code for software engineering tasks. By way of example, and without limitation, this may include the machine-learning model(s) 242 using the transformed context data to predict source code changes at line 701 in the lines of source code 108 depicted by FIG. 1A to complete the localized software engineering task to fix the body validation error response and remove a variable name when it is not embedded. The source code changes may include a) source code to be added to the source code location, b) source code to be removed from the source code location, c) source code to be replaced in the source code location, and/or d) any type of the source code changes for another source code location. A type can be a category or classification.

Following the predicting of source code changes at a source code location, the system outputs predicted source code changes at the source code location, to the code editor, block 718. The system outputs predicted source code changes at source code locations. In embodiments, this may include the agent 244 outputting the predicted source code changes at line 704 in the lines of source code 110 depicted by FIG. 1B to Sofia's code editor 212, which enables her to complete her localized software engineering task.

Having predicted and output source code changes at a source code location associated with a software engineering task, the machine-learning model(s) optionally predicts other source code changes at another source code location associated with the software engineering task, based on a modification to the predicted source code changes at the source code location and/or the issue report, received from the code editor and/or an issue tracker associated with the software developer, block 720. The system responds to a modification of the issue report and/or the source code for a software engineering task by making new predictions for the software engineering task. For example, and without limitation, this may include the machine-learning model(s) 242 responding to Sofia modifying the issue report for the software engineering task to fix the body validation error response and remove a variable name when it is not embedded, to specify that she completed the source code changes for removing a variable name when it is not embedded, and using such a modification as context data for predicting new source code changes at various source code locations associated with the software engineering task, but only to fix the body validation error response, without removing a variable name that is embedded.

After an optional prediction of other source code changes at another source code location associated with a software engineering task, the system optionally outputs the other predicted source code changes at the other source code location for the software engineering task, to the code editor, block 722. The system responds to a modification of the issue report and/or the source code for a software engineering task by outputting new predictions for the software engineering task. By way of example, and without limitation, this can include the agent 244 outputting slightly different source code changes for the localized software engineering task, but only to fix the body validation error response, without removing a variable name that is embedded, to Sofia.

Following an output of predicted source code changes, the system commits source code changes based on any predicted source code changes at any source code locations, as accepted by the code editor, block 724. The system commits predicted source code as accepted by the software developer. In embodiments, this may include the agent 244 committing the predicted source code changes, which Sofia accepted for removing a variable name that is embedded, to the software engineering task's source code control repository and closes the software engineering task on Sofia's behalf.

Predicting source code changes, outputting the predicted source code changes, and committing source code changes based on any predicted source code changes for the source code location may include predicting additional source code changes, outputting the additional source code changes, and committing source code changes based on any additional source code changes for another source code location associated with the software engineering task. For example, in addition to predicting the source code changes at line 704 in the lines of source code 110 depicted by FIG. 1B, the machine-learning model(s) 242 also predicts source code changes at line 676 in the lines of source code 112 depicted by FIG. 1A, to complete the localized software engineering task to fix the body validation error response.

After committing source code changes at the source code location, the system has the option to iteratively retrieve context data for source code changes for other source code locations, transform the context data for source code changes for the other source code locations, predict source code changes for the other source code locations, output the predicted source code changes for the other source code locations, and commit source code changes for the other source code locations until the software developer completes the software engineering task, block 726. The system enables the prediction of source code changes at other locations until a software developer complete a software engineering task. For example, and without limitation this can include the agent 244 repeating the process described above continuously, which enables Sofia to move on to any other location in source code where she wants to focus on completing each of her localized software engineering tasks, until she completes the software engineering task to fix the body validation error response at every required source code location. Then the agent 244 commits source code changes to the software engineering task's source code control repository and closes the software engineering task on the software developer's behalf.

Although FIG. 7 depicts the blocks 702-726 occurring in a specific order, the blocks 702-726 may occur in another order. In other implementations, each of the blocks 702-726 may also be executed in combination with other blocks and/or some blocks may be divided into a different set of blocks.

The agent 244 can help a software developer find anomalies in the source code immediately after the software developer writes the source code. Those anomalies may be bugs or other problems such as inefficiently written code, and finding these bugs and/or problems early helps a software developer complete a software engineering task more effectively. Large-scale versions of the machine-learning model 242 contain broad knowledge, such that with sufficient data, very few software engineering tasks or source code bases will be truly unique. Consequently, smaller portions of a software developer's source code that are different from source code predicted by the machine-learning model 242 could be considered as unique, surprising, or unpredicted, and therefore are worthy of further review by the software developer, who may discover such anomalies to be errors or inefficiently written source code.

Figure 8A:
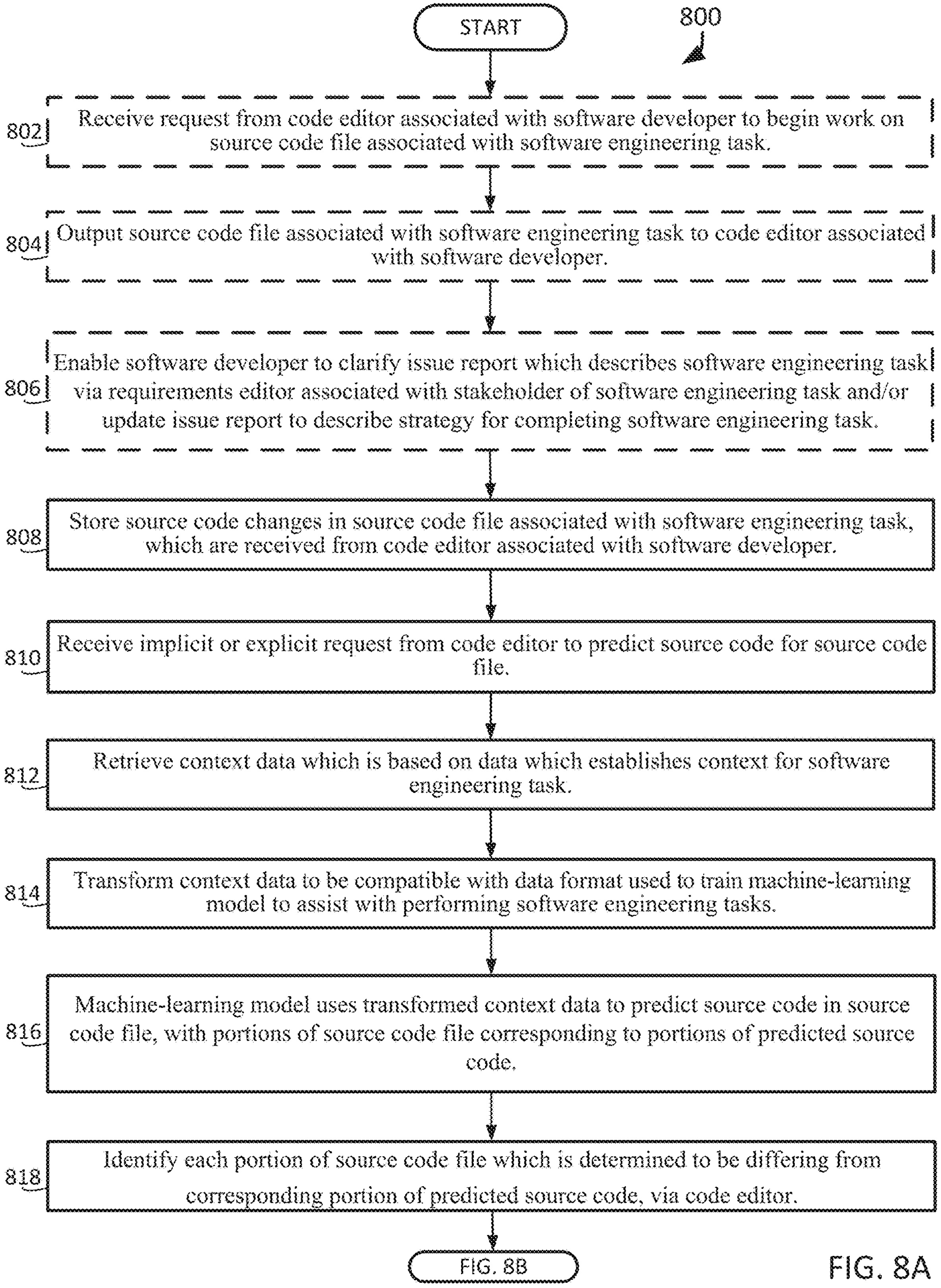
FIG. 8A and FIG. 8B depict a flowchart that illustrates a method that assists with identifying unpredicted portions of source code files for software engineering tasks, under an embodiment.
Figure 8B:
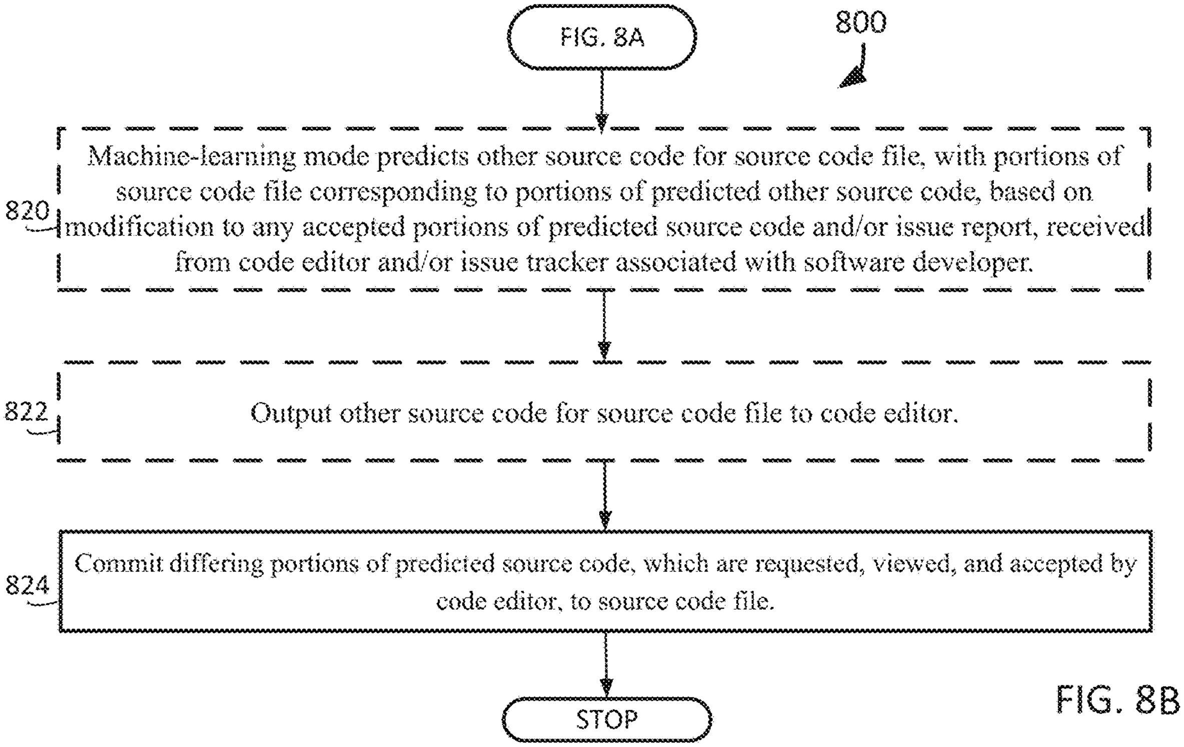

FIG. 8 is a flowchart that illustrates a method that assists with identifying unpredicted portions of source code files for software engineering tasks, under an embodiment. Flowchart 800 illustrates method acts illustrated as flowchart blocks for certain steps involved in and/or between the clients 202-204 and/or the servers 206-208 of FIG. 2.

After a system such as an issue tracking system assigns a software engineering task to a software developer, the software developer logs onto the issue tracker 216 on the client 202 and begins to read the task description. Then, a system optionally receives a request from a code editor associated with a software developer to begin working on a source code file associated with a software engineering task, block 802. The system stores source code and issue reports for software engineering tasks. For example, and without limitation, this may include the agent 244 receiving a request from the code editor 212 on the client 202 of a software developer named Sofia to begin writing source code for a source code file for the software engineering task to fix a body validation error response and remove a variable name when it is not embedded. A source code file can be an object in a computer system for storing a text listing of commands to be compiled or assembled into an executable computer program.

After optionally receiving a request for a source code file, a system optionally outputs the source code file associated with a software engineering task to a code editor associated with a software developer, block 804. The system provides source code and issue reports to software developers. By way of example, and without limitation, this may include the agent 244 sending a source code file to Sofia, who wants to work on her software engineering task to fix the body validation error response and remove a variable name when it is not embedded.

Following the optional outputting of a source code file for a software engineering task to a software developer' code editor, the system optionally enables the software developer to clarify an issue report which describes the software engineering task via an issue tracker associated with a stakeholder of the software engineering task and/or update the issue report to describe a strategy for completing the software engineering task, block 806. The system enables updates to issue reports which describe software engineering tasks. In embodiments, this may include the agent 244 enabling Sofia to communicate with the issue tracker 216 on the client 204 of Stacy Holder, who is a stakeholder for the software engineering task to fix the body validation error response and remove a variable name when it is not embedded. Sofia and Stacey agree on a high, but not the highest, priority for the software engineering task to fix the body validation error response and remove a variable name when it is not embedded.

Having optionally clarified an issue report which describes a software engineering task, the system stores source code changes in a source code file associated with the software engineering task, which are received from a code editor associated with a software developer, block 808. The stores any updates to source code and issue reports for software engineering tasks. For example, and without limitation, this may include the agent 244 storing Sofia's source code changes to the source code file for the software engineering task to fix the body validation error response and remove a variable name when it is not embedded.

After storing source code changes to a source code file, a system receives an implicit or explicit request from a code editor to predict source code for a source code file, block 810. The system is requested to predict source code for software engineering tasks. By way of example, and without limitation, this may include the agent 244 receiving an explicit request from a button pressed on Sofia's code editor 212 to predict source code for the source code file for the software engineering task to fix the body validation error response and remove a variable name when it is not embedded.

In addition to receiving an explicit request to predict source code for the source code file, the agent 244 can identify an implicit request to predict source code for the source code file. For example, Sofia uses her code editor 212 and writes source code changes for a source code file, and then stops and waits when the agent 244 informs her that a continued lack of coding activity while a displayed timer counted down without interruption will result in the machine-learning model(s) 242 predicting source code for the source code file.

Following receipt of a request for a prediction of source code for a source code file for a software engineering task, the system retrieves context data which establishes a context for the software engineering task, block 812. The system retrieves context data for a software engineering task to accurately predict for the software engineering task. In embodiments, this may include the agent 244 retrieving context data which establishes the software engineering task's context from the dynamic data pipeline 240, such Sofia's source code changes in the source code file.

Having retrieved context data which establishes a software engineering task's context, the system transforms the context data to be compatible with a data format used to train a machine-learning model(s) to assist with performing software engineering tasks, block 814. The system transforms a software engineering task's context data to be in the format used to predict for the software engineering task. For example, and without limitation, this may include the agent 244 transforming the retrieved source code changes for the source code file to be compatible with the data format used to train the machine-learning model(s) 230 to learn to predict source code for source code files associated with software engineering tasks.

After a system transforms various types of context data for a software engineering task, then a machine-learning model(s) uses the transformed context data to predict source code for the source code file associated with the software engineering task, with portions of the source code file corresponding to portions of the predicted source code, block 816. The system uses transformed data to predict source code for software engineering tasks. By way of example, and without limitation, this may include the machine-learning model(s) 242 using the transformed context data to predict source code for the source code file for the software engineering task to fix the body validation error response and remove a variable name when it is not embedded. Portions of the predicted source code, such as the prediction of "else: # pragma: no cover" are a match for portions of the source code file, such as line 702 of the source code file, "else: # pragma: no cover". A portion can be a part of a whole. Predicted source code can be a forecast of a text listing of commands to be compiled or assembled into an executable computer program.

Predicted source code may include a) source code to be added to a source code file, b) source code to be removed from a source code file, c) source code to be replaced in a source code file, and/or d) any type of source code for any other source code file. A portion of a source code file may be a line of source code, a word of source code, and/or a single text character of source code. A line can be a horizontal row of text. A word can be a single distinct meaningful text element. A single text character can be a printed or written symbol or letter.

Following the predicting of source code for a source code file, the system identifies each portion of the source code file which is determined to be differing from a corresponding portion of the predicted source code, via the code editor, block 818. The system identifies where the predicted source code differs from the source code file. In embodiments, this may include the agent 244 using the bold highlight and the underline to render the portion of line 701 ("body", field alias) in the lines of source code 114 depicted by FIG. 1B, because this portion of line 701 differs from its corresponding portion of predicted source code (loc), which has a prediction confidence score of 95% that is above the probability threshold of 75%.

Each portion of the source code file which is determined to be differing from a corresponding portion of the predicted source code is conditionally identified based on a determination of whether the corresponding portion of the predicted source code has a prediction confidence level that satisfies a threshold. For example, for each portion of predicted source code that differs from its corresponding portion of the source code file, and has a prediction confidence score below the probability threshold of 75%, the agent 244 highlights the corresponding portion of the source code file with only an underline, but not with a bold highlight, on the user interface in Sofia's code editor 212. For a portion of predicted source code that does not differ from its corresponding portion of the source code file, the agent 244 does not render anything differently on the user interface for Sofia's code editor 212 than was previously rendered.

Having identified portions of source code file which differ from portions of predicted source code, a machine-learning model(s) optionally predicts other source code for the source code file, with portions of the source code file corresponding to portions of the predicted other source code, based on a modification to any accepted portions of the predicted source code and/or the issue report, received from the code editor and/or an issue tracker associated with the software developer, block 820. The system responds to a modification of the issue report and/or the source code for a software engineering task by making new predictions for the software engineering task. For example, and without limitation, this may include the machine-learning model(s) 242 responding to Sofia modifying the issue report for the software engineering task to fix the body validation error response and remove a variable name when it is not embedded, to specify that she completed the source code changes for removing a variable name when it is not embedded, and using such a modification as context data for predicting other source code for the source code file, but only to fix the body validation error response, without removing a variable name that is embedded. An accepted portion can be a part of a whole which is approved for a purpose.

After an optional prediction of other source code for a source code file, the system optionally outputs the other predicted source code for the source code file, to a code editor, block 822. The system responds to a modification of the issue report and/or the source code for a software engineering task by outputting new predictions for the software engineering task. By way of example, and without limitation, this can include the agent 244 outputting slightly revised source code for the source code file for the software engineering task, but only to fix the body validation error response, without removing a variable name that is embedded, to Sofia.

Following the output of predicted source code for a source code file to a code editor, the system commits any differing portions of the predicted source code, which are requested and accepted by the code editor, to the source code file, block 824. The system commits predicted source code as accepted by the software developer. In embodiments, this may include the agent 244 responding to Sofia using her code editor 212 to review the bold highlighted portion of line 701 ("body", field alias), select the bold highlighted portion of line 701, which causes the displaying of the portion of predicted source code (loc) which differs from the bold highlighted portion of line 701, and selecting to accept the portion of predicted source code to replace the bold highlighted portion of line 701 in the lines of source code 114 depicted by FIG. 1B. The agent 244 commits Sofia's accepted portion of the predicted source code to the software engineering task's source code control repository and closes the software engineering task to fix the body validation error response on the Sofia's behalf. If Sofia's source code changes started to fix the body validation error response, then the many highlighted portions of the source code file could identify the predicted source code required to complete her software engineering task, but if Sofia's source code changes completed her task, then the few highlighted portions of the source code file could identify the predicted source code that corrects her possible mistakes and/or makes her source code more efficient. A differing portion can be a part of a whole which is distinguishable from a corresponding part.

Although FIG. 8 depicts the blocks 802-824 occurring in a specific order, the blocks 802-824 may occur in another order. In other implementations, each of the blocks 802-824 may also be executed in combination with other blocks and/or some blocks may be divided into a different set of blocks.

Software engineering is a complex process that may be facilitated by tools. Typical systems include focused, vertical tools that assist in varying degrees with narrow slices of the process. This system 200 subsumes the prior art by learning the entire software development process end-to-end in a generalized model. A related agent 244 and one or more related tool instantiations use the machine-learning model(s) 242 and a software developer's own engineering data to assist and automate with a highly generalized characterization of software development tasks. Embodiments of this system 200 assist and automate with varying degrees, with the most general being able to perform an entire software engineering task assigned to a software developer by reading an issue report that uses natural language to describe a software engineering task.

An exemplary hardware device in which the subject matter may be implemented shall be described. Those of ordinary skill in the art will appreciate that the elements illustrated in FIG. 9 may vary depending on the system implementation. With reference to FIG. 9, an exemplary system for implementing the subject matter disclosed herein includes a hardware device 900, including a processing unit 902, a memory 904, a storage 906, a data entry module 908, a display adapter 910, a communication interface 912, and a bus 914 that couples elements 904-912 to the processing unit 902.

The bus 914 may comprise any type of bus architecture. Examples include a memory bus, a peripheral bus, a local bus, etc. The processing unit 902 is an instruction execution machine, apparatus, or device and may comprise a microprocessor, a digital signal processor, a graphics processing unit, an application specific integrated circuit (ASIC), a field programmable gate array (FPGA), etc. The processing unit 902 may be configured to execute program instructions stored in the memory 904 and/or the storage 906 and/or received via the data entry module 908.

The memory 904 may include a read only memory (ROM) 916 and a random-access memory (RAM) 918. The memory 904 may be configured to store program instructions and data during operation of the device 900. In various embodiments, the memory 904 may include any of a variety of memory technologies such as static random-access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example.

The memory 904 may also include nonvolatile memory technologies such as nonvolatile flash RAM (NVRAM) or ROM. In some embodiments, it is contemplated that the memory 904 may include a combination of technologies such as the foregoing, as well as other technologies not specifically mentioned. When the subject matter is implemented in a computer system, a basic input/output system (BIOS) 920, containing the basic routines that help to transfer information between elements within the computer system, such as during start-up, is stored in the ROM 916.

The storage 906 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 900.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which may store data that is accessible by a computer, such as magnetic cassettes, flash memory cards, digital video disks, Bernoulli cartridges, RAM, ROM, and the like may also be used in the exemplary operating environment. As used here, a "computer-readable medium" may include one or more of any suitable media for storing the executable instructions of a computer program in one or more of an electronic, magnetic, optical, and electromagnetic format, such that the instruction execution machine, system, apparatus, or device may read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high-definition DVD (HD-DVD™), a BLU-RAY disc; and the like.

A number of program modules may be stored on the storage 906, the ROM 916 or the RAM 918, including an operating system 922, one or more applications programs 924, program data 926, and other program modules 928. A user may enter commands and information into the hardware device 900 through data entry module 908. The data entry module 908 may include mechanisms such as a keyboard, a touch screen, a pointing device, etc.

Other external input devices (not shown) are connected to the hardware device 900 via an external data entry interface 930. By way of example and not limitation, external input devices may include a microphone, joystick, game pad, satellite dish, scanner, or the like. In some embodiments, external input devices may include video or audio input devices such as a video camera, a still camera, etc. The data entry module 908 may be configured to receive input from one or more users of the device 900 and to deliver such input to the processing unit 902 and/or the memory 904 via the bus 914.

A display 932 is also connected to the bus 914 via the display adapter 910. The display 932 may be configured to display output of the device 900 to one or more users. In some embodiments, a given device such as a touch screen, for example, may function as both the data entry module 908 and the display 932. External display devices may also be connected to the bus 914 via the external display interface 934. Other peripheral output devices, not shown, such as speakers and printers, may be connected to the hardware device 900.

The hardware device 900 may operate in a networked environment using logical connections to one or more remote nodes (not shown) via the communication interface 912. The remote node may be another computer, a server, a router, a peer device or other common network node, and typically includes many or all of the elements described above relative to the hardware device 900. The communication interface 912 may interface with a wireless network and/or a wired network.

Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 912 may include logic configured to support direct memory access (DMA) transfers between the memory 904 and other devices.

In a networked environment, program modules depicted relative to the hardware device 900, or portions thereof, may be stored in a remote storage device, such as, for example, on a server. It will be appreciated that other hardware and/or software to establish a communications link between the hardware device 900 and other devices may be used.

Figure 9:
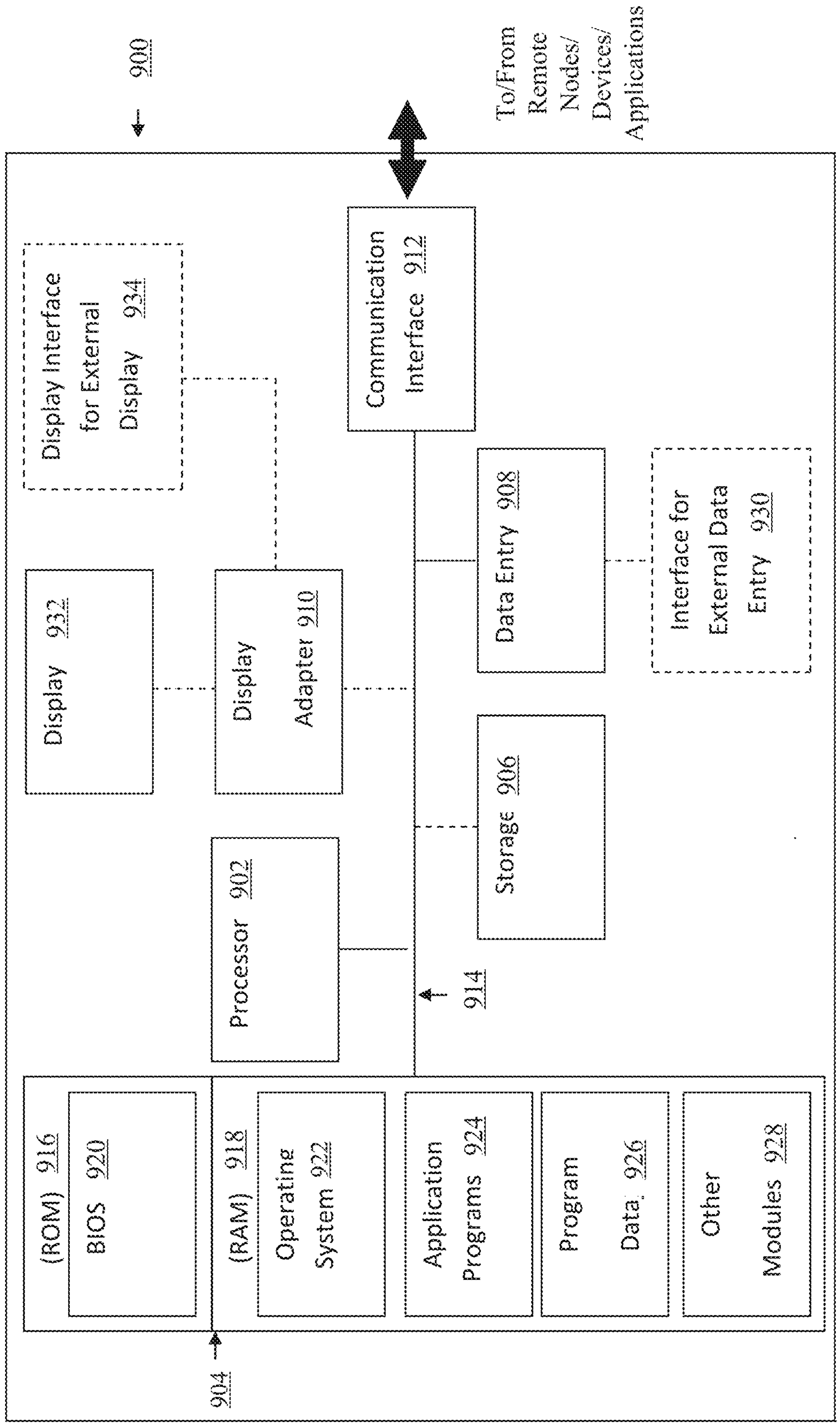
FIG. 9 is a block diagram illustrating an example hardware device in which the subject matter may be implemented.

It should be understood that the arrangement of the hardware device 900 illustrated in FIG. 9 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 900.

In addition, while at least one of these components are implemented at least partially as an electronic hardware component, and therefore constitutes the machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 9.

Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the descriptions above, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in a context, it is not meant to be limiting as those of skill in the art will appreciate that various of the acts and operations described hereinafter may also be implemented in hardware.

To facilitate an understanding of the subject matter described above, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system that assists with automating software engineering tasks, the system comprising:

one or more processors; and a non-transitory computer readable medium storing a plurality of instructions, which when executed, cause the one or more processors to:

output an issue report that describes a software engineering task;

retrieve context data that establishes a context for the software engineering task, in response to receiving a request to predict source code changes for the software engineering task;

transform the context data to be compatible with a data format used to train a machine-learning model;

predict, by the machine-learning model using the transformed context data, the source code changes for the software engineering task;

cause the predicted source code changes for the software engineering task to be displayed as selectable and expandable compact representations on a graphical user interface;

cause, in response to a selection of an individual compact representation, a corresponding section of the predicted source code changes to be displayed on the graphical user interface; and commit the displayed section of the predicted source code changes to source code in response to being accepted.

2. The system of claim 1, wherein the plurality of instructions further causes the one or more processors to display the issue report on the graphical user interface, the issue report being configured to receive at least one of: a) a clarification of the issue report that describes the software engineering task or b) an update to the issue report to describe a strategy for completing the software engineering task.

3. The system of claim 1, wherein the plurality of instructions further causes the one or more processors to store any update to the issue report that describes the software engineering task.

4. The system of claim 3, wherein the plurality of instructions further causes the one or more processors to predict, by the machine-learning model, other source code changes for the software engineering task, based on a modification to at least one of the issue report or the predicted source code changes for the software engineering task.

5. The system of claim 4, wherein the plurality of instructions further causes the one or more processors to output the other source code changes for the software engineering task.

6. The system of claim 1, wherein the source code changes comprise at least one of: a) the source code changes to be added to source code associated with the software engineering task, b) the source code changes to be removed from the source code associated with the software engineering task, or c) the source code changes to replace a portion of the source code associated with the software engineering task.

7. A computer-implemented method that assists with automating software engineering tasks, the method comprising:

outputting an issue report that describes a software engineering task;

retrieving context data that establishes a context for the software engineering task, in response to receiving a request to predict source code changes for the software engineering task;

transforming the context data to be compatible with a data format used to train a machine-learning model;

predicting, by the machine-learning model using the transformed context data, the source code changes for the software engineering task;

causing the predicted source code changes for the software engineering task to be displayed as selectable and expandable compact representations on a graphical user interface;

causing, in response to a selection of an individual compact representation, a corresponding section of the predicted source code changes to be displayed on the graphical user interface; and committing the displayed section of the predicted source code changes to source code in response to being accepted.

8. The method of claim 7, wherein the computer-implemented method further comprises displaying the issue report on the graphical user interface, the issue report being configured to receive at least one of: a) a clarification of the issue report that describes the software engineering task or b) an update to the issue report to describe a strategy for completing the software engineering task.

9. The method of claim 7, wherein the computer-implemented method further comprises storing any update to the issue report that describes the software engineering task.

10. The method of claim 9, wherein the computer-implemented method further comprises predicting, by the machine-learning model, other source code changes for the software engineering task, based on a modification to at least one of the issue report or the predicted source code changes for the software engineering task.

11. The method of claim 10, wherein the computer-implemented method further comprises outputting the other source code changes for the software engineering task.

12. The method of claim 7, wherein the source code changes comprise at least one of: a) the source code changes to be added to source code associated with the software engineering task, b) the source code changes to be removed from the source code associated with the software engineering task, or c) the source code changes to replace a portion of the source code associated with the software engineering task.

13. A computer program product, comprising a non-transitory computer-readable medium having a computer-readable program code embodied therein to be executed by one or more processors, the program code including instructions to:

output an issue report that describes a software engineering task;

retrieve context data that establishes a context for the software engineering task, in response to receiving a request to predict source code changes for the software engineering task;

transform the context data to be compatible with a data format used to train a machine-learning model;

predict, by the machine-learning model using the transformed context data, the source code changes for the software engineering task;

cause the predicted source code changes for the software engineering task to be displayed as selectable and expandable compact representations on a graphical user interface;

cause, in response to a selection of an individual compact representation, a corresponding section of the predicted source code changes to be displayed on the graphical user interface; and commit the displayed section of the predicted source code changes to source code in response to being accepted.

14. The computer program product of claim 13, wherein the program code includes further instructions to display the issue report on the graphical user interface, the issue report being configured to receive at least one of: a) a clarification of the issue report that describes the software engineering task or b) an update to the issue report to describe a strategy for completing the software engineering task.

15. The computer program product of claim 13, wherein the program code includes further instructions to store any update to the issue report that describes the software engineering task.

16. The computer program product of claim 15, wherein the program code includes further instructions to:

predict, by the machine-learning model, other source code changes for the software engineering task, based on a modification to at least one of the issue report or the predicted source code changes for the software engineering task, and output the other source code changes for the software engineering task.

17. The computer program product of claim 13, wherein the source code changes comprise at least one of: a) the source code changes to be added to source code associated with the software engineering task, b) the source code changes to be removed from the source code associated with the software engineering task, or c) the source code changes to replace a portion of the source code associated with the software engineering task.

* * * * *